(12) United States Patent
Sugiyama et al.

(10) Patent No.: US 11,782,306 B2
(45) Date of Patent: Oct. 10, 2023

(54) DISPLAY DEVICE

(71) Applicant: Japan Display Inc., Tokyo (JP)

(72) Inventors: Hiroki Sugiyama, Tokyo (JP); Kentaro Okuyama, Tokyo (JP); Manabu Mizuno, Tokyo (JP)

(73) Assignee: Japan Display Inc., Tokyo (JP)

( * ) Notice: Subject to any disclaimer, the term of this patent is extended or adjusted under 35 U.S.C. 154(b) by 149 days.

(21) Appl. No.: 16/923,707

(22) Filed: Jul. 8, 2020

(65) Prior Publication Data

US 2020/0341332 A1    Oct. 29, 2020

Related U.S. Application Data

(63) Continuation of application No. PCT/JP2018/046883, filed on Dec. 19, 2018.

(30) Foreign Application Priority Data

Jan. 12, 2018    (JP) .................................. 2018-003756

(51) Int. Cl.
    *G02F 1/1335*    (2006.01)
    *G02F 1/1334*    (2006.01)
    *G02F 1/1362*    (2006.01)

(52) U.S. Cl.
    CPC ...... *G02F 1/133553* (2013.01); *G02F 1/1334* (2013.01); *G02F 1/136209* (2013.01); *G02F 1/136286* (2013.01)

(58) Field of Classification Search
CPC ............. G02F 1/133553; G02F 1/1334; G02F 1/136209; G02F 1/136286; G02F 1/133616
See application file for complete search history.

(56) References Cited

U.S. PATENT DOCUMENTS

2003/0112391 A1\* 6/2003 Jang .................. G02F 1/133555
                                      349/114
2006/0261337 A1\* 11/2006 Koma ............... G02F 1/133603
                                      257/59

(Continued)

FOREIGN PATENT DOCUMENTS

EP         0823587 A1 \*   2/1998 ........... G02B 6/0051
JP     H07-104288 A     4/1995

(Continued)

OTHER PUBLICATIONS

International Search Report issued in connection with PCT/JP2018/046883, dated Mar. 12, 2019. (2 pages).

(Continued)

*Primary Examiner* — Michael H Caley
*Assistant Examiner* — Agnes Dobrowolski
(74) *Attorney, Agent, or Firm* — K&L Gates LLP

(57) ABSTRACT

According to an aspect, a display device includes: a first light-transmitting substrate; a second light-transmitting substrate disposed so as to face the first light-transmitting substrate; a liquid crystal layer comprising polymer dispersed liquid crystals between the first light-transmitting substrate and the second light-transmitting substrate; and a multilayered film on an outer surface or surfaces of at least one of the first light-transmitting substrate and the second light-transmitting substrate, the multilayered film being configured to reflect light from the first light-transmitting substrate or the second light-transmitting substrate, and absorb light from outside the first light-transmitting substrate or the second light-transmitting substrate.

10 Claims, 19 Drawing Sheets

(56) References Cited

U.S. PATENT DOCUMENTS

| | | | |
|---|---|---|---|
| 2008/0055526 A1* | 3/2008 | Ino | G02F 1/133555 |
| | | | 349/114 |
| 2014/0326956 A1* | 11/2014 | Wang | H01L 51/5284 |
| | | | 438/46 |
| 2016/0116768 A1 | 4/2016 | Okuyama et al. | |
| 2016/0163271 A1* | 6/2016 | Sakaigawa | G09G 3/3406 |
| | | | 345/694 |
| 2017/0210995 A1 | 7/2017 | Kim et al. | |
| 2017/0261809 A1 | 9/2017 | Mizuno et al. | |
| 2018/0314107 A1* | 11/2018 | Park | G02F 1/133617 |

FOREIGN PATENT DOCUMENTS

| | | |
|---|---|---|
| JP | H07-104322 A | 4/1995 |
| JP | 2013-041090 A | 2/2013 |
| JP | 2016-085452 A | 5/2016 |
| JP | 2017-167214 A | 9/2017 |

OTHER PUBLICATIONS

Japanese Office Action dated Jan. 11, 2022 in corresponding Japanese Application No. 2018-003756.

* cited by examiner

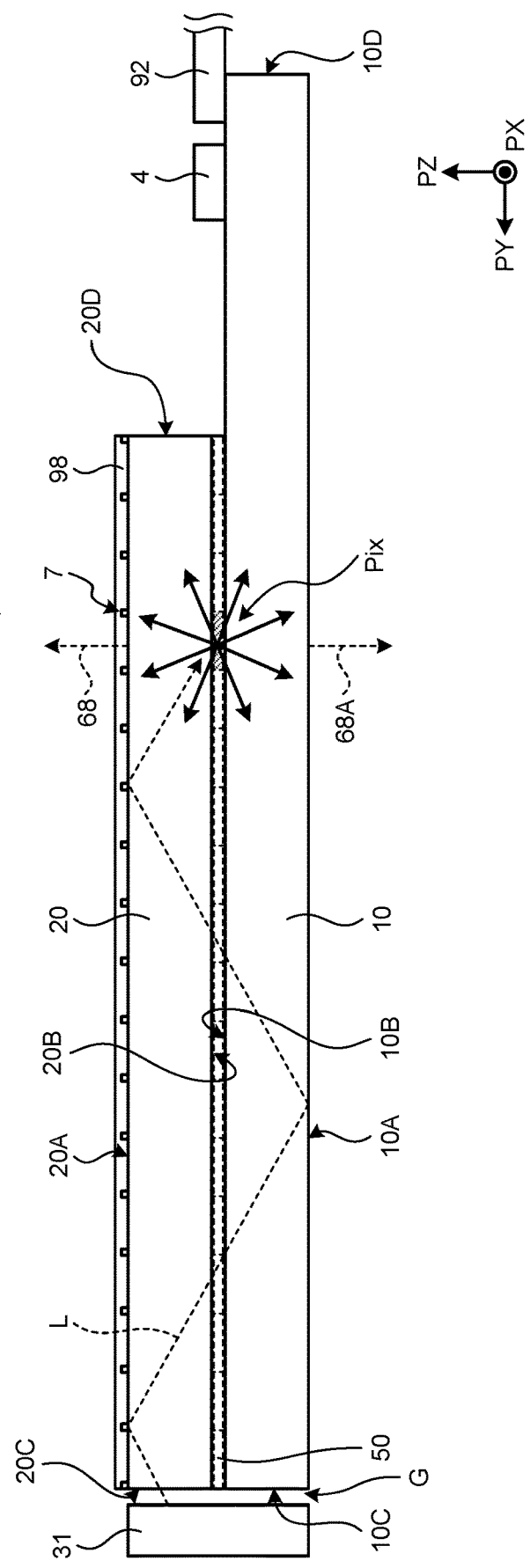

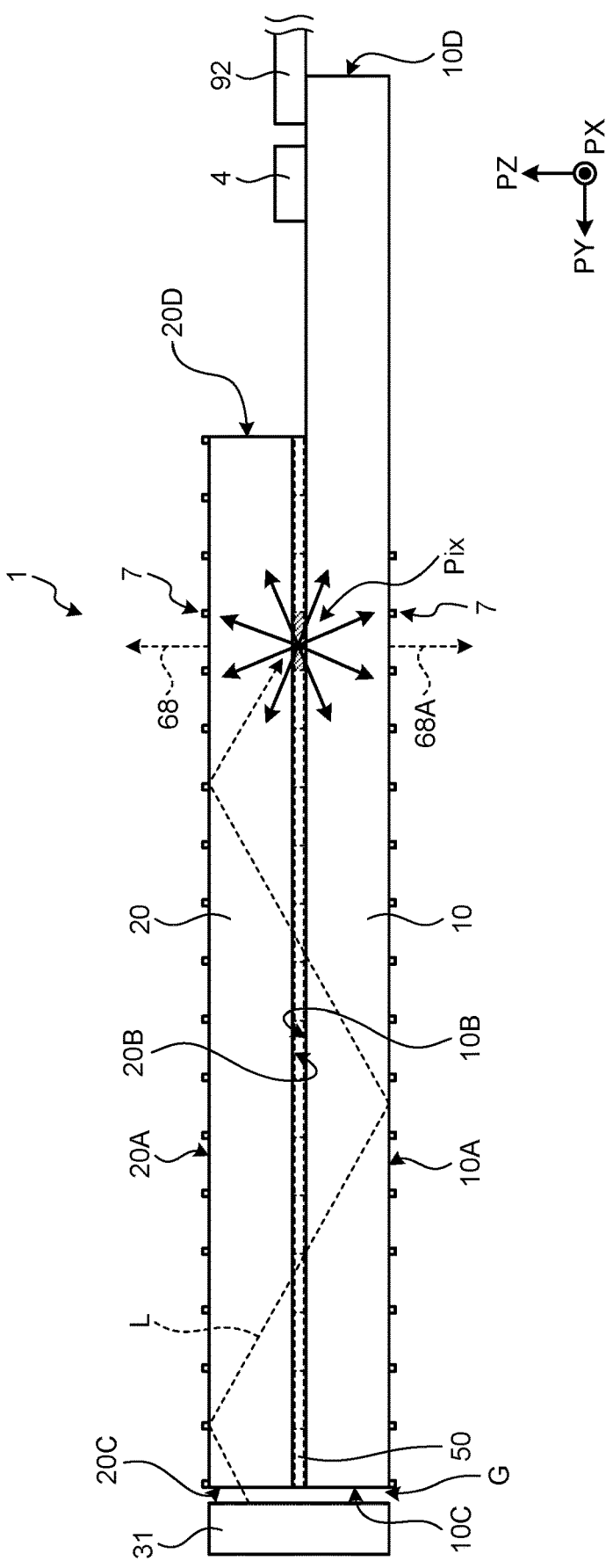

DISPLAY DEVICE

CROSS-REFERENCE TO RELATED APPLICATION

This application claims the benefit of priority from Japanese Patent Application No. 2018-003756 filed on Jan. 12, 2018 and International Patent Application No. PCT/2018/046883 filed on Dec. 19, 2018, the entire contents of which are incorporated herein by reference.

BACKGROUND

1. Technical Field

The present disclosure relates to a display device.

2. Description of the Related Art

Japanese Patent Application Laid-open Publication No. 2016-085452 (JP-A-2016-085452) describes a display device that includes a light modulation layer disposed between a pair of light-transmitting substrates and including a plurality of light modulation devices that have predetermined refractive index anisotropy and are different in responsiveness to an electric field generated by electrodes provided on the light-transmitting substrates, and also includes a light source that emits light in a predetermined color into the light modulation layer from a side surface of the light modulation layer. The light modulation layer transmits the incident light received from the light source when the electric field is not generated, and scatters the incident light and emits the scattered light to the light-transmitting substrates when the electric field is generated.

In the display device described in JP-A-2016-085452, internal scattering occurs at an internal metal layer, which may reduce transmittance.

For the foregoing reasons, there is a need for a display device allowing a background to be visible when viewed from one surface of a display panel toward the other surface thereof, and being capable of preventing the transmittance from decreasing.

SUMMARY

According to an aspect, a display device includes: a first light-transmitting substrate; a second light-transmitting substrate disposed so as to face the first light-transmitting substrate; a liquid crystal layer comprising polymer dispersed liquid crystals between the first light-transmitting substrate and the second light-transmitting substrate; and a multilayered film on an outer surface or surfaces of at least one of the first light-transmitting substrate and the second light-transmitting substrate, the multilayered film being configured to reflect light from the first light-transmitting substrate or the second light-transmitting substrate, and absorb light from outside the first light-transmitting substrate or the second light-transmitting substrate.

BRIEF DESCRIPTION OF THE DRAWINGS

FIG. 17 is a sectional view illustrating an exemplary section of a display device according to a first modification of the embodiment;

FIG. 18 is a sectional view illustrating an exemplary section of a display device according to a second modification of the embodiment;

DETAILED DESCRIPTION

Figure 1:
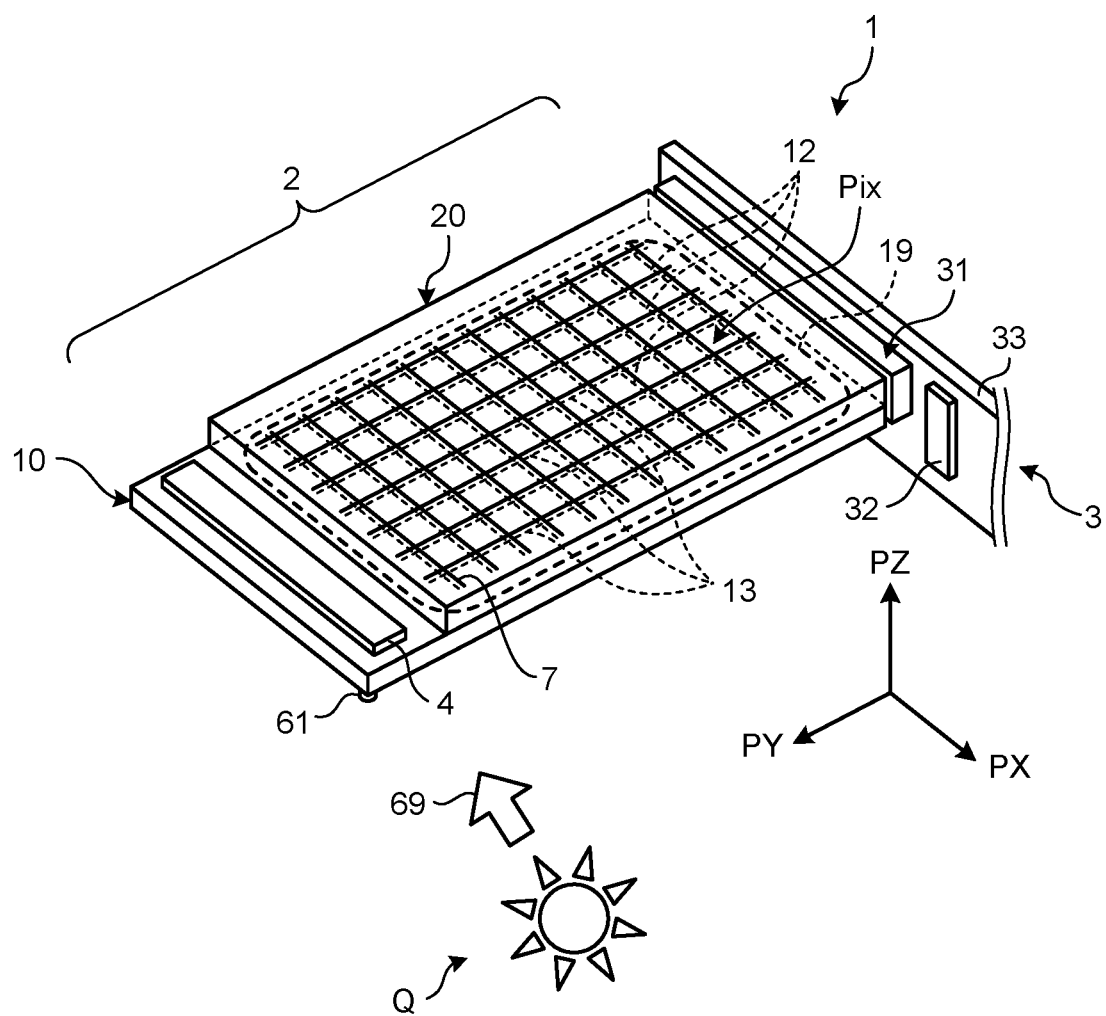
FIG. 1 is a perspective view illustrating an example of a display device according to an embodiment of the present disclosure.

The following describes a form (an embodiment) for carrying out the present invention in detail with reference to the drawings. The present disclosure is not limited to the description of the embodiment to be given below. Components to be described below include those easily conceivable by those skilled in the art or those substantially identical thereto. Moreover, the components to be described below can be appropriately combined. The disclosure is merely an example, and the present disclosure naturally encompasses appropriate modifications easily conceivable by those skilled in the art while maintaining the gist of the invention. To further clarify the description, widths, thicknesses, shapes, and the like of various parts are schematically illustrated in the drawings as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate. In this disclosure, when an element A is described as being "on" another element B, the element A can be directly on the other element B, or there can be one or more elements between the element A and the other element B.

Figure 2:
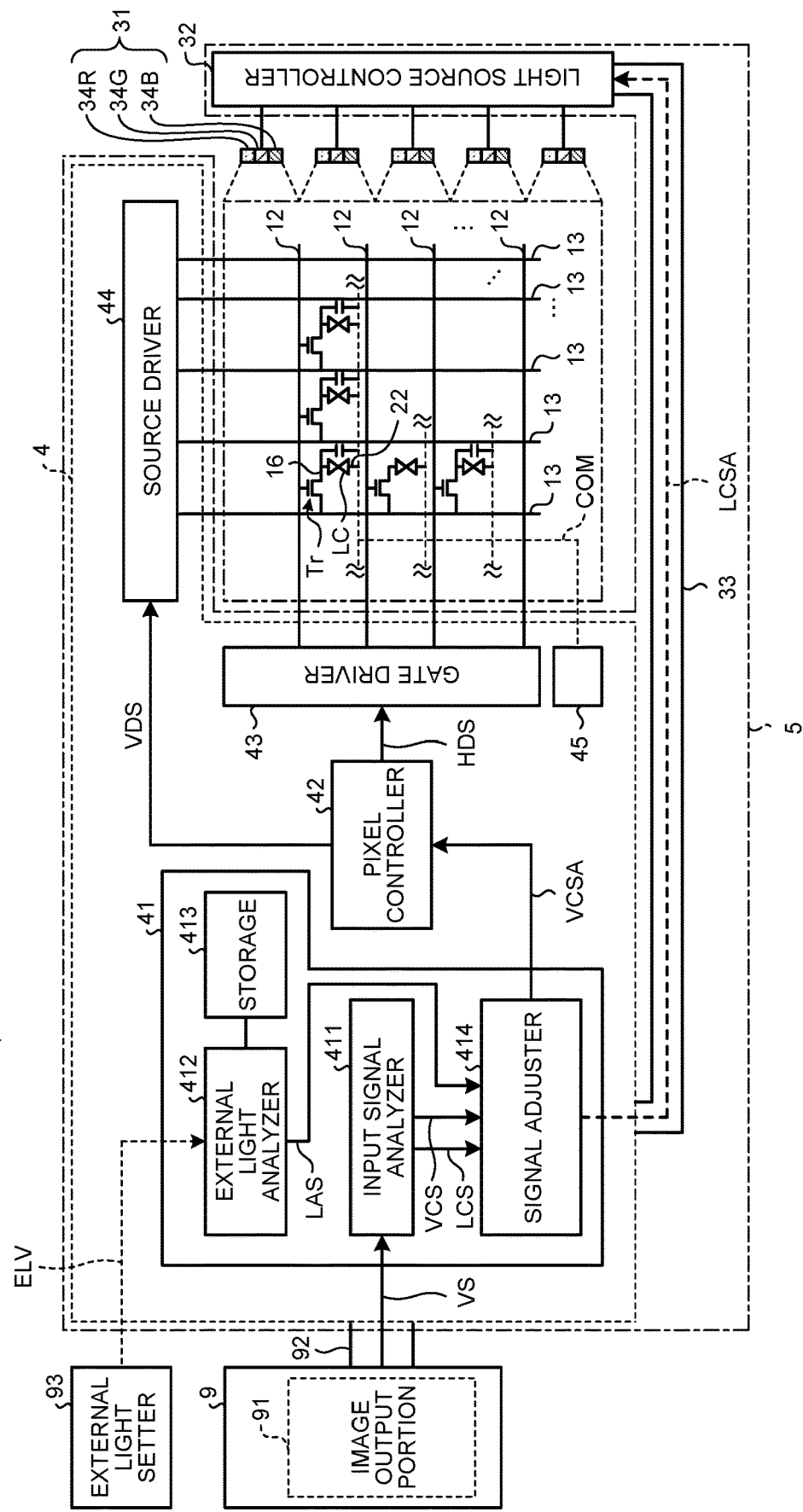
FIG. 2 is a block diagram illustrating the display device of FIG. 1.
Figure 3:
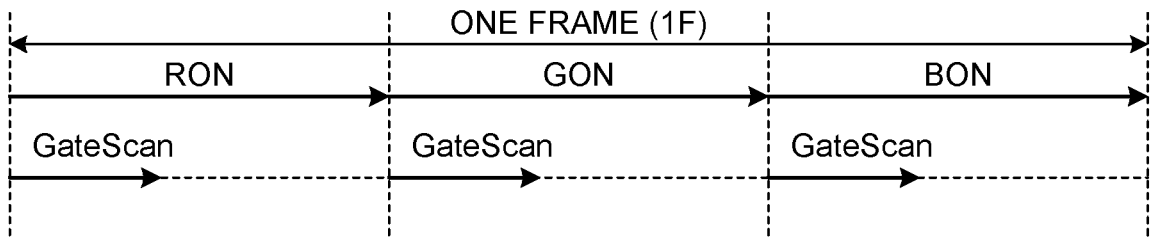
FIG. 3 is a timing chart explaining timing of light emission by a light source in a field-sequential system.

FIG. 1 is a perspective view illustrating an example of a display device according to the present embodiment. FIG. 2 is a block diagram illustrating the display device of FIG. 1. FIG. 3 is a timing chart explaining timing of light emission by a light source in a field-sequential system.

As illustrated in FIG. 1, a display device 1 includes a display panel 2, a side light source 3, a drive circuit 4 constituting part of a display controller 5 (refer to FIG. 2) to be described later, and an external light setter 93. A PX direction denotes one direction of the display panel 2. A PY direction denotes a direction orthogonal to the PX direction. A PZ direction denotes a direction orthogonal to a PX-PY plane.

Figure 5:
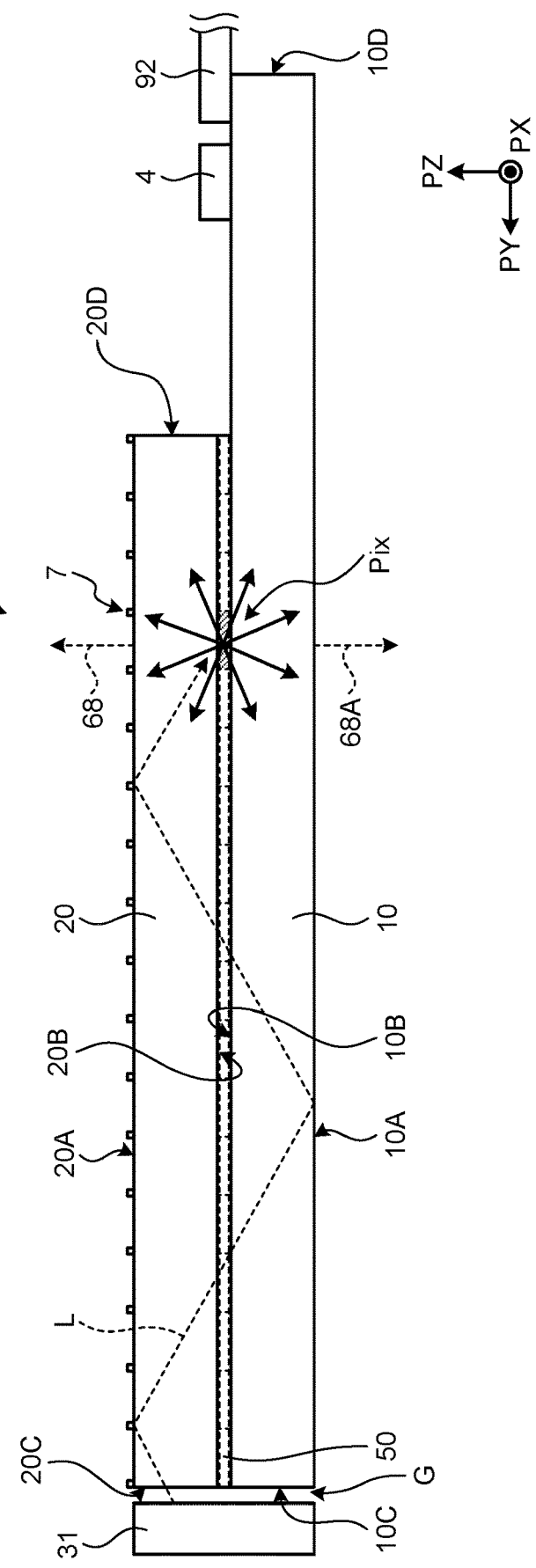
FIG. 5 is a sectional view illustrating an exemplary section of the display device of FIG. 1.

The display panel 2 includes a first light-transmitting substrate 10, a second light-transmitting substrate 20, and a liquid crystal layer 50 (refer to FIG. 5). The second light-transmitting substrate 20 is disposed so as to face a surface of the first light-transmitting substrate 10 in a direction orthogonal thereto (in the PZ direction in FIG. 1). Polymer dispersed liquid crystals (to be described later) are sealed in the liquid crystal layer 50 (refer to FIG. 5) by the first light-transmitting substrate 10, the second light-transmitting substrate 20, and a sealing part 19.

As illustrated in FIG. 1, the inside of the sealing part 19 in the display panel 2 serves as a display region. A plurality of pixels Pix are arranged in a matrix having a row-column configuration in the display region. In the present disclosure, a row refers to a pixel row including m pixels Pix arranged in one direction, and a column refers to a pixel column including n pixels Pix arranged in a direction orthogonal to the direction in which the rows are arranged. The values of m and n are determined according to a display resolution in the vertical direction and a display resolution in the horizontal direction. A plurality of scanning lines 12 are wired row by row, and a plurality of signal lines 13 are wired column by column.

As illustrated in FIG. 1, a multilayered film 7 is provided on an outer surface of the second light-transmitting substrate 20. The multilayered film 7 reflects light from a first direction, and absorbs light from a second direction different from the first direction. For example, light that has propagated in the second light-transmitting substrate 20 and reached the multilayered film 7 is reflected by the multilayered film 7 back into the second light-transmitting substrate 20, and external light 69 that has propagated from outside the second light-transmitting substrate 20 and reached the multilayered film 7 is absorbed by the multilayered film 7. In the present embodiment, the multilayered film 7 is disposed at a position overlapping with the scanning lines 12 and the signal lines 13 in a plan view. As a result, the multilayered film 7 has a grid shape in the plan view.

The side light source 3 includes a light emitter 31. As illustrated in FIG. 2, a light source controller 32, a light source substrate 33 with the light emitter 31 and the light source controller 32 disposed thereon, and the drive circuit 4 constitute the display controller 5. The light source substrate 33 is a flexible substrate, and serves also as wiring for electrically coupling the light source controller 32 to the drive circuit 4 (refer to FIG. 2). The light emitter 31 is electrically coupled to the light source controller 32 through the wiring in the light source substrate 33.

For example, the external light setter 93 is a visible light sensor, and the visible light sensor detects the external light 69 of, for example, an external light source Q, and generates a signal ELV of external light information corresponding to the external light 69. The external light setter 93 transmits the generated signal ELV of the external light information to the drive circuit 4. The external light setter 93 is fixed to a surface of the first light-transmitting substrate 10. The external light setter 93 may be fixed at any position as long as being capable of detecting the external light 69 around the display panel 2.

As illustrated in FIG. 1, the drive circuit 4 is fixed to the surface of the first light-transmitting substrate 10. As illustrated in FIG. 2, the drive circuit 4 includes an analyzer 41, a pixel controller 42, a gate driver 43, a source driver 44, and a common potential driver 45. The first light-transmitting substrate 10 has an area larger than that of the second light-transmitting substrate 20 in an X-Y plane, and the drive circuit 4 is provided on an overhanging portion of the first light-transmitting substrate 10 exposed from the second light-transmitting substrate 20.

The analyzer 41 receives an input signal (such as a red-green-blue (RGB) signal) VS from an image output portion 91 of an external higher-level controller 9 through a flexible substrate 92.

The analyzer 41 includes an input signal analyzer 411, an external light analyzer 412, a storage 413, and a signal adjuster 414. The input signal analyzer 411 generates a first pixel input signal VCS and a light source control signal LCS based on an externally received input signal VS. The light source control signal LCS is a signal including information on a light quantity of the light emitter 31 set according to, for example, input gradation values given to all the pixels Pix. For example, the light quantity of the light emitter 31 is set smaller when a darker image is displayed, and set larger when a brighter image is displayed.

The first pixel input signal VCS is a signal for determining a gradation value to be given to each of the pixels Pix of the display panel 2 based on the input signal VS. In other words, the first pixel input signal VCS is a signal including gradation information on the gradation value of each of the pixels Pix. The pixel controller 42 sets an output gradation value by applying correction processing, such as gamma correction and expansion processing, to each of the input gradation values of the first pixel input signal VCS.

The external light analyzer 412 receives the signal ELV of the external light information from the external light setter 93 described above. The external light analyzer 412 generates an adjustment signal LAS according to the signal ELV of the external light information based on a set value stored in the storage 413.

The signal adjuster 414 generates a light source control signal LCSA from the light source control signal LCS according to the adjustment signal LAS, and transmits the light source control signal LCSA to the light source controller 32. The signal adjuster 414 transmits a second pixel input signal VCSA generated from the first pixel input signal VCS according to the adjustment signal LAS.

The pixel controller 42 generates a horizontal drive signal HDS and a vertical drive signal VDS based on the second pixel input signal VCSA. In the present embodiment, since the display device 1 is driven by the field-sequential system, the horizontal drive signal HDS and the vertical drive signal VDS are generated for each color emittable by the light emitter 31.

The gate driver 43 sequentially selects the scanning lines 12 of the display panel 2 based on the horizontal drive signal HDS during one vertical scanning period. The scanning lines 12 can be selected in any order.

The source driver 44 supplies a gradation signal according to the output gradation value of each of the pixels Pix to corresponding one of the signal lines 13 of the display panel 2 based on the vertical drive signal VDS during one horizontal scanning period.

In the present embodiment, the display panel 2 is an active-matrix panel. Thus, the display panel 2 includes the signal (source) lines 13 and the scanning (gate) lines 12 extending in the PX direction and the PY direction in a plan view, and includes switching elements Tr at three dimensionally intersecting portions between the signal lines 13 and the scanning lines 12.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to each of the signal lines 13, and the gate electrode of the switching element Tr is coupled to each of the scanning lines 12. The other of the source electrode and the drain electrode is coupled to one end of a liquid crystal capacitor LC. The liquid crystal capacitor LC is coupled at one end thereof to the switching element Tr through a pixel electrode 16, and coupled at the other end thereof to a common potential COM through a common electrode 22. The common potential COM is supplied from the common potential driver 45.

The light emitter 31 includes a light emitter 34R of a first color (such as red), a light emitter 34G of a second color (such as green), and a light emitter 34B of a third color (such as blue). The light source controller 32 emits the light emitter 34R of the first color, the light emitter 34G of the second color, and the light emitter 34B of the third color in a time-division manner based on the light source control signal LCSA. In this manner, the light emitter 34R of the first color, the light emitter 34G of the second color, and the light emitter 34B of the third color are driven by what is called the field-sequential system.

As illustrated in FIG. 3, during a first sub-frame (first predetermined time) RON, the light emitter 34R of the first color emits light, and some of the pixels Pix selected during one vertical scanning period GateScan scatter light to perform display. At this time, on the entire display panel 2, if the above-described gradation signal according to the output gradation value of each of the pixels Pix selected during this vertical scanning period GateScan is supplied to corresponding one of the signal lines 13, only the first color is lit up.

Subsequently, during a second sub-frame (second predetermined time) GON, the light emitter 34G of the second color emits light, and some of the pixels Pix selected during one vertical scanning period GateScan scatter light to perform display. At this time, on the entire display panel 2, if the above-described gradation signal according to the output gradation value of each of the pixels Pix selected during this vertical scanning period GateScan is supplied to corresponding one of the signal lines 13, only the second color is lit up.

Further, during a third sub-frame (third predetermined time) BON, the light emitter 34B of the third color emits light, and some of the pixels Pix selected during one vertical scanning period GateScan scatter light to perform display. At this time, on the entire display panel 2, if the above-described gradation signal according to the output gradation value of each of the pixels Pix selected during this vertical scanning period GateScan is supplied to corresponding one of the signal lines 13, only the third color is lit up.

Since a human eye has limited temporal resolving power, and produces an afterimage, an image with a combination of three colors is recognized in a period of one frame (1F). The field-sequential system can eliminate the need for a color filter, and thus can reduce an absorption loss by the color filter. As a result, higher transmittance can be obtained. In the color filter system, one pixel is made up of sub-pixels obtained by dividing each of the pixels Pix into sub-pixels of the first color, the second color, and the third color. In contrast, in the field-sequential system, since the pixel need not be divided into sub-pixels in such a manner, the resolution can be easily increased.

Figure 4:
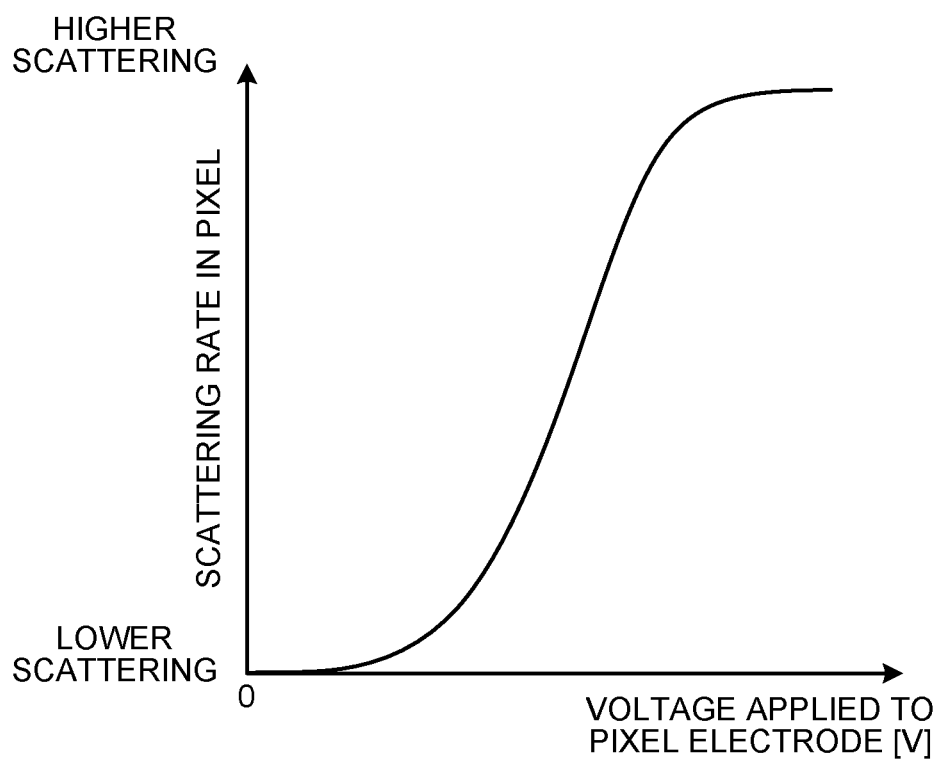
FIG. 4 is an explanatory diagram illustrating a relation between a voltage applied to a pixel electrode and a scattering state of a pixel.
Figure 6:
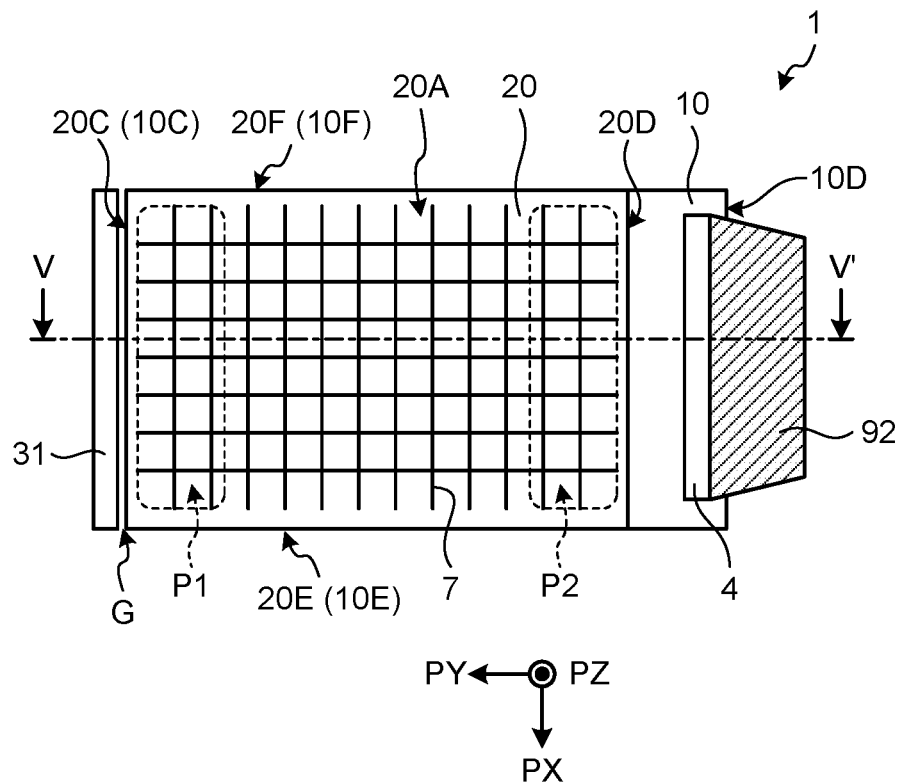
FIG. 6 is a plan view illustrating a planar surface of the display device of FIG. 1.
Figure 7:
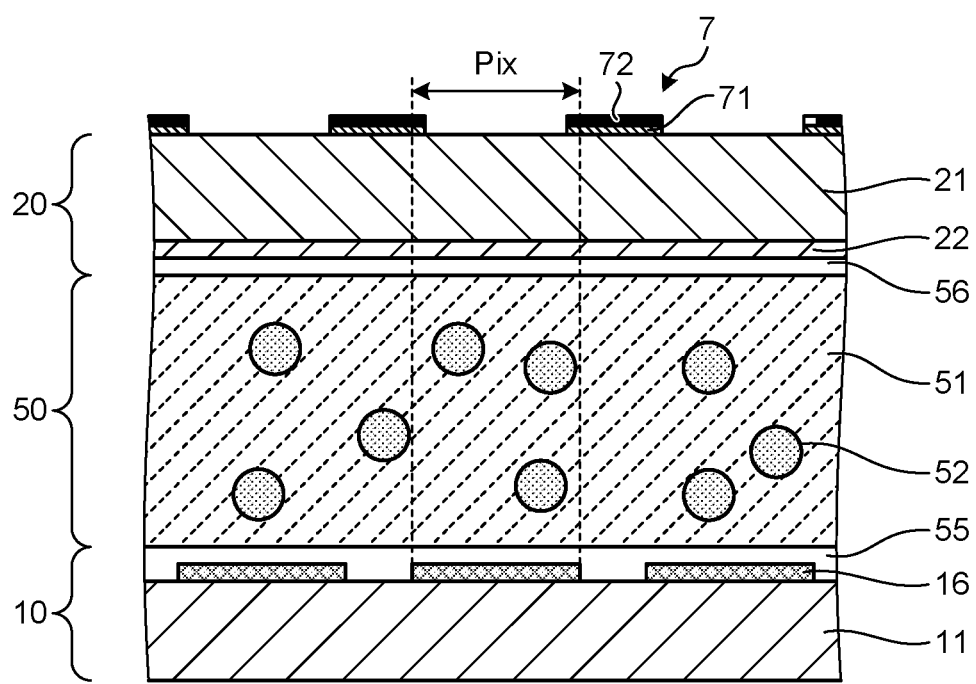
FIG. 7 is an enlarged sectional view obtained by enlarging a liquid crystal layer portion of FIG. 5.
Figure 8:
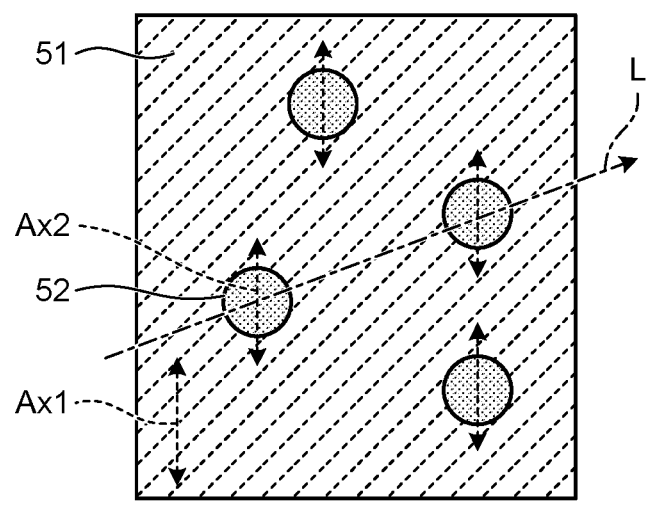
FIG. 8 is a sectional view for explaining a non-scattering state in the liquid crystal layer.
Figure 9:
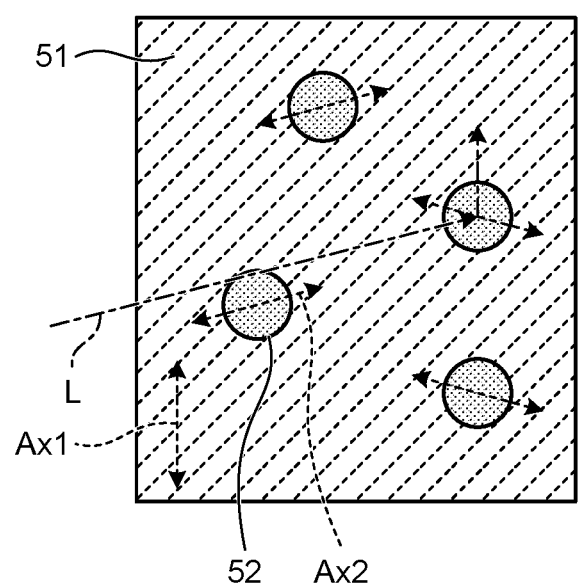
FIG. 9 is a sectional view for explaining the scattering state in the liquid crystal layer.

FIG. 4 is an explanatory diagram illustrating a relation between a voltage applied to the pixel electrode and a scattering state of the pixel. FIG. 5 is a sectional view illustrating an exemplary section of the display device of FIG. 1. FIG. 6 is a plan view illustrating a planar surface of the display device of FIG. 1. FIG. 5 illustrates a V-V' section of FIG. 6. FIG. 7 is an enlarged sectional view obtained by enlarging the liquid crystal layer portion of FIG. 5. FIG. 8 is a sectional view for explaining a non-scattering state in the liquid crystal layer. FIG. 9 is a sectional view for explaining the scattering state in the liquid crystal layer.

If the gradation signal according to the output gradation value of each of the pixels Pix is supplied to the above-described signal lines 13 for the pixels Pix selected during one vertical scanning period GateScan, the voltage applied to the pixel electrode 16 changes with the gradation signal. The change in the voltage applied to the pixel electrode 16 changes the voltage between the pixel electrode 16 and the common electrode 22. The scattering state of the liquid crystal layer 50 for each of the pixels Pix is controlled according to the voltage applied to the pixel electrode 16, and the scattering rate in the pixel Pix changes, as illustrated in FIG. 4.

As illustrated in FIGS. 5 and 6, the first light-transmitting substrate 10 has a first principal surface 10A, a second principal surface 10B, a first side surface 10C, a second side surface 10D, a third side surface 10E, and a fourth side surface 10F. The first principal surface 10A and the second principal surface 10B are parallel surfaces. The first side surface 10C and the second side surface 10D are parallel surfaces. The third side surface 10E and the fourth side surface 10F are parallel surfaces.

As illustrated in FIGS. 5 and 6, the second light-transmitting substrate 20 has a first principal surface 20A, a second principal surface 20B, a first side surface 20C, a second side surface 20D, a third side surface 20E, and a fourth side surface 20F. The first principal surface 20A and the second principal surface 20B are parallel surfaces. The first side surface 20C and the second side surface 20D are parallel surfaces. The third side surface 20E and the fourth side surface 20F are parallel surfaces.

As illustrated in FIGS. 5 and 6, the light emitter 31 is provided so as to face the first side surface 20C of the second light-transmitting substrate 20. As illustrated in FIG. 5, the light emitter 31 emits light-source light L to the first side surface 20C of the second light-transmitting substrate 20. The first side surface 20C of the second light-transmitting substrate 20 facing the light emitter 31 serves as a plane of light incidence. A gap G is provided between the light emitter 31 and the plane of light incidence. The gap G forms an air layer.

As illustrated in FIG. 5, the light-source light L emitted from the light emitter 31 propagates in a direction away from the first side surface 20C while being reflected by the first principal surface 10A of the first light-transmitting substrate 10 and the first principal surface 20A of the second light-transmitting substrate 20. When the light-source light L travels from the first principal surface 10A of the first light-transmitting substrate 10 or the first principal surface 20A of the second light-transmitting substrate 20 to the air layer, the light-source light L enters a medium having a lower refractive index from a medium having a higher refractive index. Thus, if the angle of incidence of the light-source light L incident on the first principal surface 10A of the first light-transmitting substrate 10 or the first principal surface 20A of the second light-transmitting substrate 20 is larger than a critical angle, the light-source light L is fully reflected by the first principal surface 10A of the first light-transmitting substrate 10 or the first principal surface 20A of the second light-transmitting substrate 20.

As illustrated in FIG. 5, the light-source light L that has propagated in the first light-transmitting substrate 10 and the second light-transmitting substrate 20 is scattered by any of the pixels Pix including liquid crystals placed in the scattering state, and the angle of incidence of the scattered light becomes an angle smaller than the critical angle. Thus, emission light 68 or 68A is emitted outward from the first principal surface 10A of the first light-transmitting substrate 10 or the first principal surface 20A of the second light-transmitting substrate 20. The emission light 68 or 68A emitted outward from the first principal surface 10A of the first light-transmitting substrate 10 or the first principal surface 20A of the second light-transmitting substrate 20 is viewed by the viewer. The following describes the polymer dispersed liquid crystals placed in the scattering state and the polymer dispersed liquid crystals in the non-scattering state, using FIGS. 7 to 9.

As illustrated in FIG. 7, the first light-transmitting substrate 10 is provided with a first orientation film 55, and the second light-transmitting substrate 20 is provided with a second orientation film 56. The first and the second orientation films 55 and 56 are, for example, vertical orientation films.

A solution obtained by dispersing liquid crystals in a monomer of a polymer is filled between the first light-transmitting substrate 10 and the second light-transmitting substrate 20. Subsequently, in a state where the monomer and the liquid crystals are oriented by the first and the second orientation films 55 and 56, the monomer is polymerized by ultraviolet rays or heat to form a bulk 51. This process forms the liquid crystal layer 50 including the reverse-mode polymer dispersed liquid crystals in which the liquid crystals are dispersed in gaps of a polymer network formed in a mesh shape.

In this manner, the liquid crystal layer 50 includes the bulk 51 formed of the polymer and a plurality of fine particles 52 dispersed in the bulk 51. The fine particles 52 include the liquid crystals. Both the bulk 51 and the fine particles 52 have optical anisotropy.

The orientation of the liquid crystals included in the fine particles 52 is controlled by a voltage difference between the pixel electrode 16 and the common electrode 22. If the voltage of the common electrode 22 is constant, the orientation of the liquid crystals is changed by the voltage applied to the pixel electrode 16. The degree of scattering of light passing through the pixel Pix changes with change in the orientation of the liquid crystals.

For example, as illustrated in FIG. 8, the direction of an optical axis Ax1 of the bulk 51 is equal to the direction of an optical axis Ax2 of the fine particles 52 when no voltage is applied between the pixel electrode 16 and the common electrode 22. The optical axis Ax2 of the fine particles 52 is parallel to the PZ direction of the liquid crystal layer 50. The optical axis Ax1 of the bulk 51 is parallel to the PZ direction of the liquid crystal layer 50 regardless of whether the voltage is applied.

Ordinary-ray refractive indices of the bulk 51 and the fine particles 52 are equal to each other. When no voltage is applied between the pixel electrode 16 and the common electrode 22, the difference of refractive index between the bulk 51 and the fine particles 52 is zero in all directions. The liquid crystal layer 50 is placed in the non-scattering state of not scattering the light-source light L. The light-source light L propagates in a direction away from the light emitter 31 while being reflected by the first principal surface 10A of the first light-transmitting substrate 10 and the first principal surface 20A of the second light-transmitting substrate 20. When the liquid crystal layer 50 is in the non-scattering state of not scattering the light-source light L, a background on the first principal surface 20A side of the second light-transmitting substrate 20 is visible from the first principal surface 10A of the first light-transmitting substrate 10, and a background on the first principal surface 10A side of the first light-transmitting substrate 10 is visible from the first principal surface 20A of the second light-transmitting substrate 20.

As illustrated in FIG. 9, in the space between the pixel electrode 16 subjected to the voltage and the common electrode 22, the optical axis Ax2 of any of the fine particles 52 is inclined by an electric field generated between the pixel electrode 16 and the common electrode 22. Since the optical axis Ax1 of the bulk 51 is not changed by the electric field, the direction of the optical axis Ax1 of the bulk 51 differs from the direction of the optical axis Ax2 of the fine particles 52. The light-source light L is scattered in the pixel Pix including the pixel electrode 16 subjected to the voltage. As described above, the viewer views part of the scattered light-source light L emitted outward from the first principal surface 10A of the first light-transmitting substrate 10 or the first principal surface 20A of the second light-transmitting substrate 20.

In the pixel Pix including the pixel electrode 16 not subjected to the voltage, the background on the first principal surface 20A side of the second light-transmitting substrate 20 is visible from the first principal surface 10A of the first light-transmitting substrate 10, and the background on the first principal surface 10A side of the first light-transmitting substrate 10 is visible from the first principal surface 20A of the second light-transmitting substrate 20. In the display device 1 of the present embodiment, when the input signal VS is entered from the image output portion 91, the voltage is applied to the pixel electrode 16 of the pixel Pix for displaying an image, and the image based on the input signal VS becomes visible together with the background.

The light-source light L is scattered in the pixel Pix including the pixel electrode 16 subjected to the voltage, and emitted outward to display the image, which is displayed so as to be superimposed on the background. In other words, the display device 1 of the present embodiment combines the emission light 68 or the emission light 68A with the background to display the image so as to be superimposed on the background. When the external light 69 has entered the display panel 2, the external light 69 is also scattered in the pixel Pix according to the applied voltage, and is emitted as the emission light 68 described above.

Figure 10:
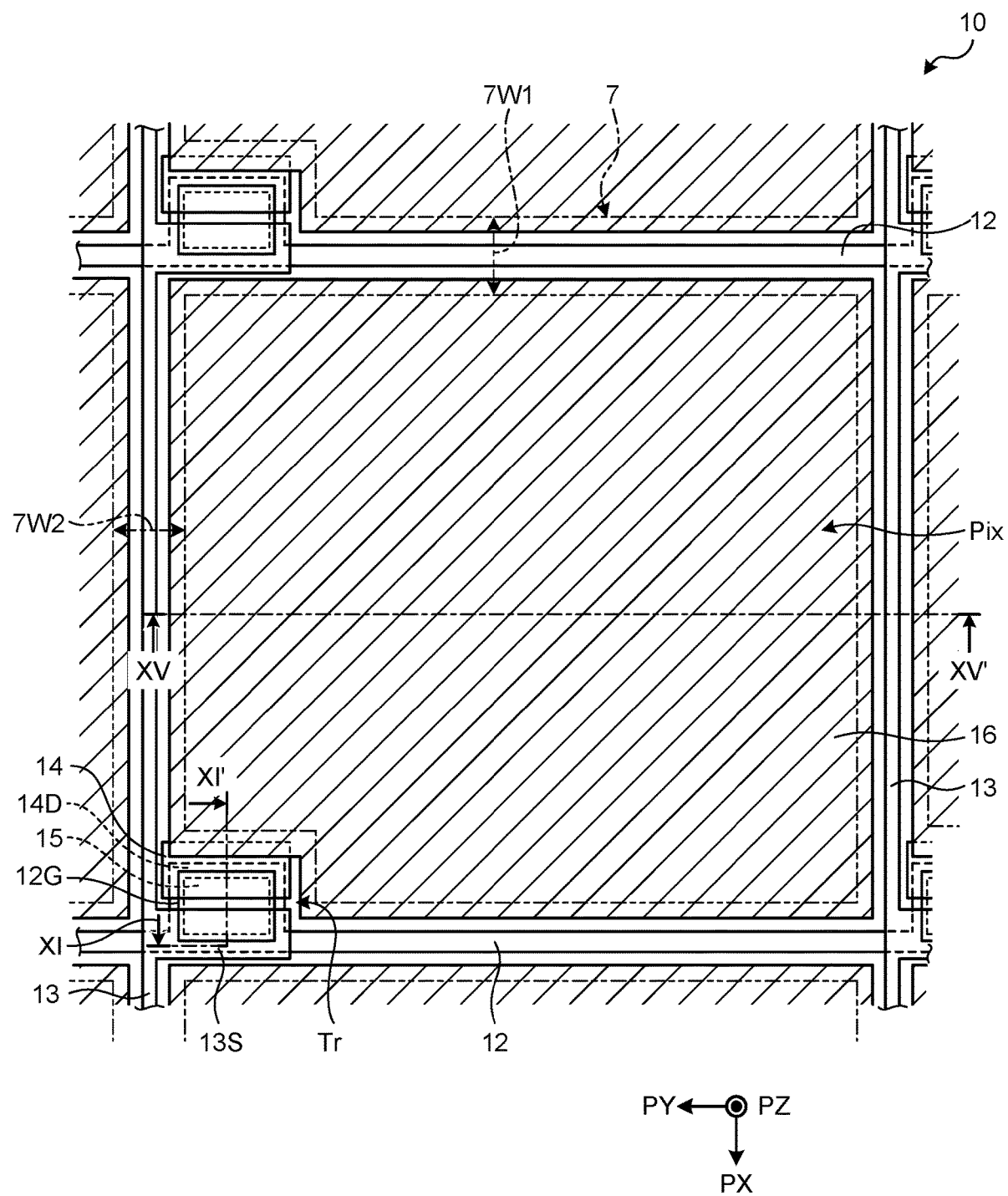
FIG. 10 is a plan view illustrating the pixel.
Figure 11:
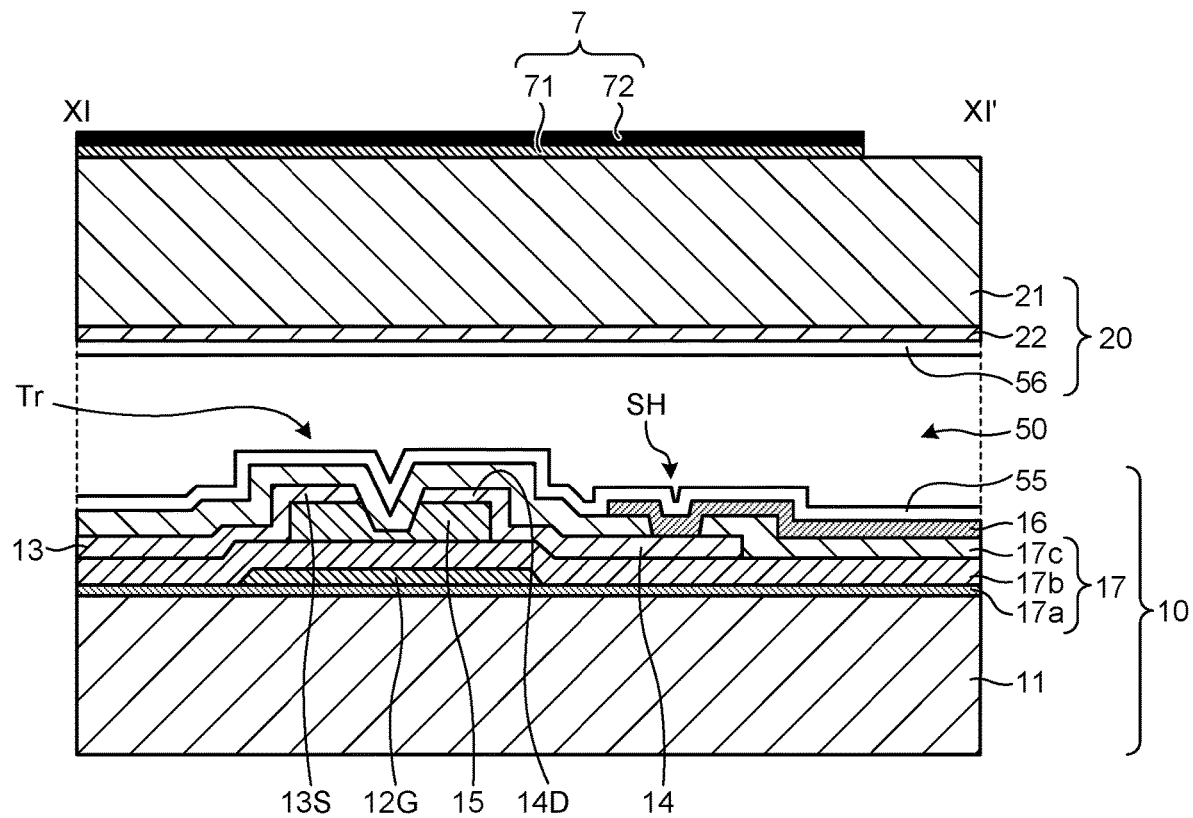
FIG. 11 is a sectional view along XI-XI' in FIG. 10.

FIG. 10 is a plan view illustrating the pixel. FIG. 11 is a sectional view along XI-XI' in FIG. 10. As illustrated in FIGS. 1, 2, and 10, the first light-transmitting substrate 10 is provided with the signal lines 13 and the scanning lines 12 so as to form a grid in the plan view. A region surrounded by the adjacent scanning lines 12 and the adjacent signal lines 13 corresponds to the pixel Pix. The pixel Pix is provided with the pixel electrode 16 and the switching element Tr. In the present embodiment, the switching element Tr is a bottom-gate thin film transistor. The switching element Tr includes a semiconductor layer 15 overlapping, in the plan view, with a gate electrode 12G electrically coupled to corresponding one of the scanning lines 12.

The scanning lines 12 are wiring of a metal such as molybdenum (Mo) or aluminum (Al), a stacked body of these metals, or an alloy thereof. The signal lines 13 are wiring of a metal, such as aluminum, or an alloy thereof.

The semiconductor layer 15 is provided so as not to protrude from the gate electrode 12G in the plan view. As a result, the light-source light L traveling toward the semiconductor layer 15 from the gate electrode 12G side is reflected, and light leakage is less likely to occur in the semiconductor layer 15

As illustrated in FIG. 10, a source electrode 13S electrically coupled to corresponding one of the signal lines 13 overlaps with one end portion of the semiconductor layer 15 in the plan view.

As illustrated in FIG. 10, a drain electrode 14D is provided at a position adjacent to the source electrode 13S across a central portion of the semiconductor layer 15 in the plan view. The drain electrode 14D overlaps with the other end portion of the semiconductor layer 15 in the plan view. A portion overlapping with neither the source electrode 13S nor the drain electrode 14D serves as a channel of the switching element Tr. As illustrated in FIG. 11, conductive wiring 14 coupled to the drain electrode 14D is electrically coupled to the pixel electrode 16 at a through-hole SH.

As illustrated in FIG. 11, the first light-transmitting substrate 10 includes a first base material 11 made of, for example, glass. The first base material 11 may be made of a resin, such as polyethylene terephthalate, as long as having a light transmitting capability. An insulating layer 17 is provided on the first base material 11. The insulating layer 17 includes a first insulating layer 17a, a second insulating layer 17b, and a third insulating layer 17c. The first insulating layer 17a is provided on the first base material 11, and the scanning line 12 and the gate electrode 12G are provided on the first insulating layer 17a. The second insulating layer 17b is provided so as to cover the scanning line 12. The first insulating layer 17a and the second insulating layer 17b are each made of, for example, a transparent inorganic insulating member, such as a silicon nitride member.

The semiconductor layer 15 is stacked on the second insulating layer 17b. The semiconductor layer 15 is made of, for example, amorphous silicon, but may be made of polysilicon or an oxide semiconductor.

The source electrode 13S and the signal line 13 partially covering the semiconductor layer 15, the drain electrode 14D partially covering the semiconductor layer 15, and the conductive wiring 14 are provided on the second insulating layer 17b. The drain electrode 14D is made of the same material as that of the signal line 13. A third insulating layer 17c is provided on the semiconductor layer 15, the signal lines 13, and the drain electrode 14D. The third insulating layer 17c is made of, for example, a transparent inorganic insulating member, such as a silicon nitride member.

The pixel electrode 16 is provided on the third insulating layer 17c. The pixel electrode 16 is made of a light-transmitting conductive member, such as an indium tin oxide (ITO) member. The pixel electrode 16 is electrically coupled to the conductive wiring 14 and the drain electrode 14D through contact holes provided in the third insulating layer 17c. The first orientation film 55 is provided on the pixel electrode 16.

The second light-transmitting substrate 20 includes a second base material 21 made of, for example, glass. The second base material 21 may be made of a resin, such as polyethylene terephthalate, as long as having a light transmitting capability. The second base material 21 is provided with the common electrode 22. The common electrode 22 is made of a light-transmitting conductive member, such as an ITO member. The second orientation film 56 is provided on a surface of the common electrode 22.

Figure 12:
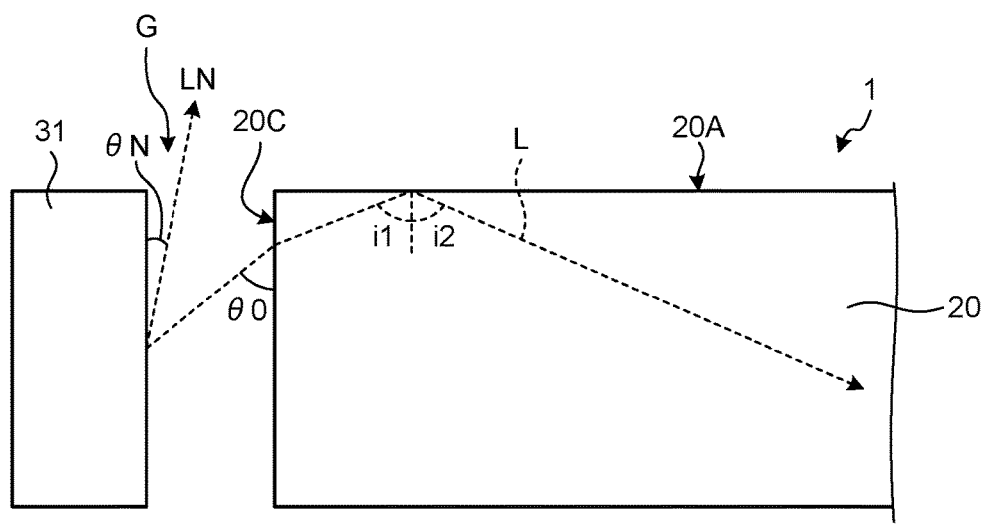
FIG. 12 is a diagram explaining incident light from a light emitter.

FIG. 12 is a diagram explaining the incident light from the light emitter. The light from the light emitter 31 is incident on the first side surface 20C of the second light-transmitting substrate 20 at an angle θ0, and then is incident on the first principal surface 20A of the second light-transmitting substrate 20 at an angle i1. If the angle i1 is larger than the critical angle, the light-source light L is fully reflected at an angle i2 by the first principal surface 20A of the second light-transmitting substrate 20, and propagates in the second light-transmitting substrate 20. Since the gap G is provided between the light emitter 31 and the first side surface 20C (plane of light incidence) as illustrated in FIG. 12, light-source light LN at an angle θN that reduces the angle i1 to below the critical angle is not guided to the first side surface 20C of the second light-transmitting substrate 20.

As illustrated in FIG. 11, in the multilayered film 7, a reflection layer 71 and a light-absorbing layer 72 are stacked in this order from the second light-transmitting substrate 20 side. The reflection layer 71 is located on the first principal surface 20A of the second light-transmitting substrate 20. In this way, the multilayered film 7 of the present embodiment is disposed in a layer different from those of the scanning line 12, the signal line 13, and the switching element Tr.

The reflection layer 71 illustrated in FIG. 11 reflects the light that has propagated in the second light-transmitting substrate 20 and reached the reflection layer 71 back into the second light-transmitting substrate 20. The light-absorbing layer 72 absorbs the light that has propagated from outside the second light-transmitting substrate 20 and reached the multilayered film 7. The reflection layer 71 is made of, for example, chromium or a chromium alloy. The light-absorbing layer 72 is blacker than the reflection layer 71, and is made of, for example, a chromium oxide.

In FIG. 10, an alternate long and two short dashes line indicates a portion occupied by the overlapping multilayered film 7. As illustrated in FIG. 10, a width 7W1 in the PX direction of the multilayered film 7 of the present embodiment is larger than a width in the PX direction of the scanning line 12. A width 7W2 in the PY direction of the multilayered film 7 of the present embodiment is larger than a width in the PY direction of the signal line 13. The multilayered film 7 of the present embodiment covers an area occupied by the switching element Tr. According to the above configuration, the multilayered film 7 of the present embodiment overlaps with the scanning lines 12, the signal lines 13, and the switching elements Tr in the plan view, and covers the scanning lines 12, the signal lines 13, and the switching elements Tr.

Figure 13:
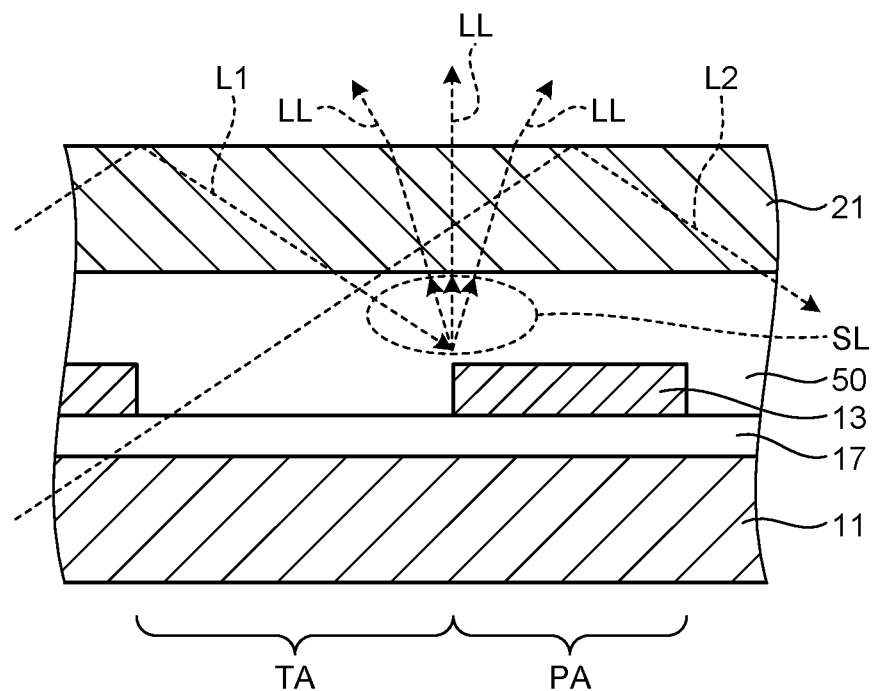
FIG. 13 is an explanatory diagram for schematically explaining internal scattering caused by an internal metal layer in a display device of a first comparative example.
Figure 14:
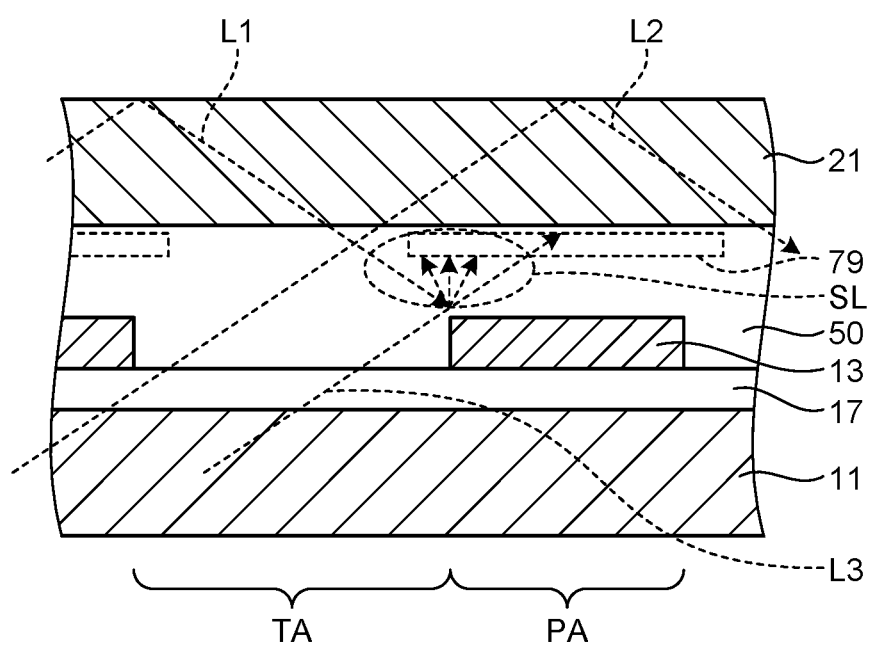
FIG. 14 is an explanatory diagram for schematically explaining the internal scattering caused by the internal metal layer in a display device of a second comparative example.
Figure 15:
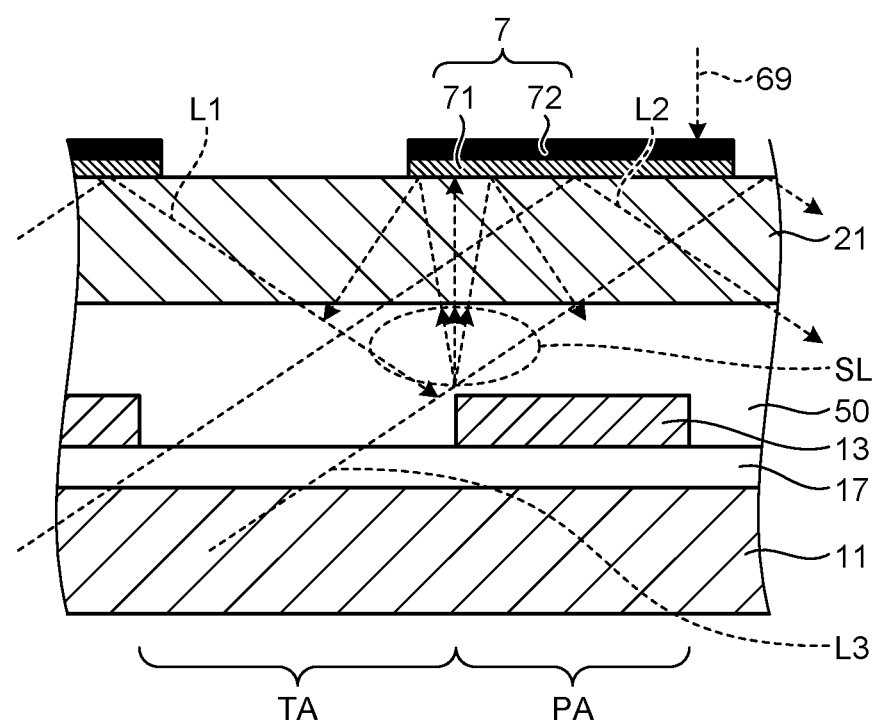
FIG. 15 is an explanatory diagram for schematically explaining the internal scattering caused by the internal metal layer in the display device of the embodiment.

FIG. 13 is an explanatory diagram for schematically explaining internal scattering caused by an internal metal layer in a display device of a first comparative example. FIG. 14 is an explanatory diagram for schematically explaining the internal scattering caused by the internal metal layer in a display device of a second comparative example. FIG. 15 is an explanatory diagram for schematically explaining the internal scattering caused by the internal metal layer in the display device of the present embodiment. FIG. 15 is also a sectional view schematically explaining a section of the first light-transmitting substrate 10 and the second light-transmitting substrate 20 at a position along XV-XV' in FIG. 10.

With reference to FIGS. 13, 14, and 15, the following describes a function of the multilayered film 7 of the present embodiment in comparison with those of the first comparative example illustrated in FIG. 13 and the second comparative example illustrated in FIG. 14. The description will be given using the signal line 13 as the internal metal layer in FIGS. 13, 14, and 15. The function to be described below is the same even if the internal metal layer is the scanning line 12, the source electrode 13S, the drain electrode 14D, or the gate electrode 12G. In FIGS. 13, 14, and 15, light beams L1, L2, and L3 are light beams based on the incidence of the light-source light L and the external light 69 on the display panel 2 described above.

The display device illustrated in FIG. 13 does not include the multilayered film 7 of the present embodiment. As illustrated in FIG. 13, the display device has a light-transmitting region TA of the above-described Pixel Pix and a wiring region PA having the above-described metal layer of, for example, the signal line 13. As illustrated in FIG. 13, when the light beam L1 of the above-described light-source light L (refer to FIG. 12) has reached the signal line 13 in the wiring region PA, the signal line 13 that has metallic luster generates scattered light SL. Part of the scattered light SL has an angle of incidence smaller than a critical angle on an interface between the second light-transmitting substrate 20 and the air layer, and leak light LL is emitted out from the first principal surface 20A.

To reduce the leak light LL, the display device of the second comparative example illustrated in FIG. 14 includes a shielding layer 79 for blocking the light at a position overlapping with the signal line 13 in the plan view on the liquid crystal layer 50 side of the second base material 21. As illustrated in FIG. 14, when the light beam L1 of the above-described light-source light L (refer to FIG. 12) has reached the signal line 13 in the wiring region PA, the signal line 13 that has metallic luster generates the scattered light SL. In this case, the shielding layer 79 restrains the scattered light SL that has the angle of incidence smaller than the critical angle on the interface between the second light-transmitting substrate 20 and the air layer. However, the shielding layer 79 also blocks the light beam L3 of the light-source light L (refer to FIG. 12) that has propagated in the first light-transmitting substrate 10 and the second light-transmitting substrate 20. This blocking may reduce the light guided by the wiring region PA adjacent to the light-transmitting region TA in the non-scattering state. As a result, the light quantity of the light propagating in the first light-transmitting substrate 10 and the second light-transmitting substrate 20 may decrease as a whole. To supplement the light quantity of the light propagating in the first light-transmitting substrate 10 and the second light-transmitting substrate 20, the output of the side light source 3 may be increased. However, the power consumption of the display device increases.

In contrast, the multilayered film 7 of the present embodiment illustrated in FIG. 15 can reflect the scattered light SL back into the second light-transmitting substrate 20. The multilayered film 7 can also reflect the light beam L3 on the reflection layer 71, and thus can prevent the reduction of the light quantity of the light propagating in the first light-transmitting substrate 10 and the second light-transmitting substrate 20. As a result, the display device of the present embodiment can reduce the power consumption.

Although the multilayered film 7 includes the reflection layer 71, the external light 69 that has propagated from outside the second light-transmitting substrate 20 and reached the multilayered film 7 is absorbed by the light-absorbing layer 72. This absorption reduces reflected light of the external light 69 reflected by the multilayered film 7.

FIGS. 16A to 16E are explanatory diagrams for schematically explaining a method of manufacturing the display device according to the present embodiment.

Seal Bonding Process

Figure 16A:
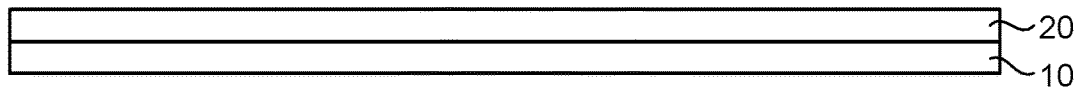
FIG. 16A is an explanatory diagram for schematically explaining a method of manufacturing the display device according to the embodiment.

As illustrated in FIG. 16A, the first light-transmitting substrate 10 and the second light-transmitting substrate 20 are first bonded together.

Multilayered Film Forming Process

Figure 16B:
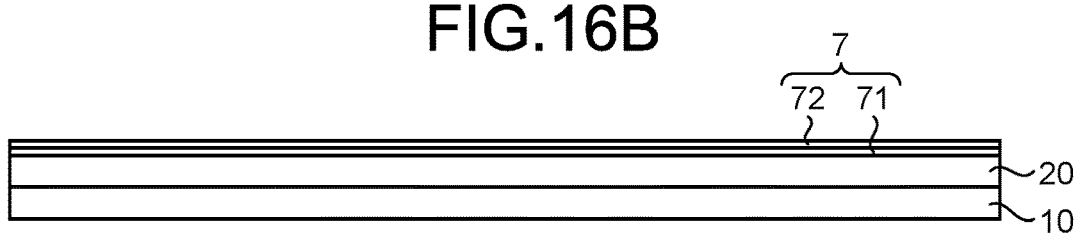
FIG. 16B is another explanatory diagram for schematically explaining the method of manufacturing the display device according to the embodiment.

Subsequently, a film of a single layer of chromium is first formed by sputtering over a surface of the seal-bonded substrates of the first light-transmitting substrate 10 and the second light-transmitting substrate 20. Subsequently, as illustrated in FIG. 16B, a film of a chromium oxide is formed by the sputtering on the surface of the formed film of the chromium single layer to form the multilayered film 7.

The formed film of the chromium oxide is black, and thus serves as the light-absorbing layer 72 described above. The above-described process allows chromium having metallic luster to remain on the second light-transmitting substrate 20 side. Chromium having metallic luster serves as the reflection layer 71.

In the present embodiment, the reflection layer 71 is made of pure chromium. However, the reflection layer 71 only needs to contain chromium, and may be made of a chromium alloy.

Lithography Process

Figure 16C:
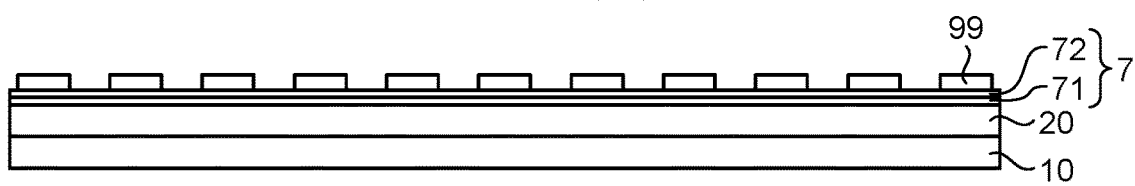
FIG. 16C is still another explanatory diagram for schematically explaining the method of manufacturing the display device according to the embodiment.

Subsequently, a resist is applied onto the multilayered film 7, and a patterned exposure is applied to the applied resist. The resist subjected to the patterned exposure is developed, so that a patterned resist layer 99 remains on the multilayered film 7, as illustrated in FIG. 16C.

Etching Process

Figure 16D:
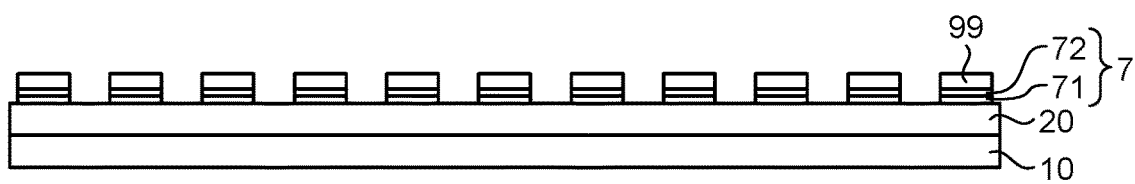
FIG. 16D is still another explanatory diagram for schematically explaining the method of manufacturing the display device according to the embodiment.

Subsequently, as illustrated in FIG. 16D, portions of the multilayered film 7 without the resist layer 99 attached thereto are etched.

Resist Removal Process

Figure 16E:
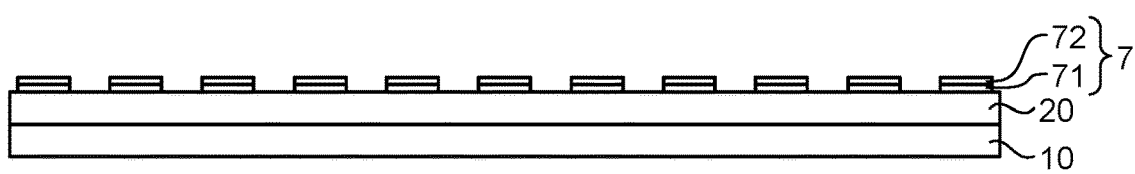
FIG. 16E is still another explanatory diagram for schematically explaining the method of manufacturing the display device according to the embodiment.

Subsequently, as illustrated in FIG. 16E, the resist layer 99 after being etched is removed. Subsequently, a dicing process may be performed to cut the substrates into an appropriate size.

Although the example has been described in which the multilayered film 7 is formed on the second light-transmitting substrate 20, the same method can be applied to form the multilayered film 7 on the first principal surface 10A of the first light-transmitting substrate 10 instead of on the second light-transmitting substrate 20.

As described above, the display device 1 of the present embodiment includes the first light-transmitting substrate 10, the second light-transmitting substrate 20 disposed so as to face the first light-transmitting substrate 10, the liquid crystal layer 50 including the polymer dispersed liquid crystals sealed between the first light-transmitting substrate 10 and the second light-transmitting substrate 20, and the multilayered film 7. The multilayered film 7 is located on the outer surface or surfaces of at least one of the first light-transmitting substrate 10 and the second light-transmitting substrate 20. The multilayered film 7 reflects the light from the first light-transmitting substrate 10 or the second light-transmitting substrate 20, and absorbs the light from outside the first light-transmitting substrate 10 or outside the second light-transmitting substrate 20.

In the first light-transmitting substrate 10 and the second light-transmitting substrate 20, the scattered light SL is generated by the metal layer of, for example, the signal lines 13, the scanning lines 12, and the switching elements Tr. The scattered light SL is also generated under the influence of the external light 69 described above. In the display device 1 of the present embodiment, the generated scattered light SL is reflected by the multilayered film 7, so that the scattered light SL is difficult to leak out of the first light-transmitting substrate 10 and the second light-transmitting substrate 20. The leakage of the scattered light SL out of the first light-transmitting substrate 10 and the second light-transmitting substrate 20 reduces the transmittance, and can cause the display device 1 to look white. In contrast, the display device 1 of the present embodiment can prevent the transmittance from decreasing in a non-display state. Therefore, the background can be more visible from one surface of the display panel toward the other surface thereof.

The light-source light L also generates the scattered light SL. In a display state, the scattered light SL generated by the metal layer of, for example, the signal lines 13, the scanning lines 12, and the switching elements Tr is reflected by the multilayered film 7, so that the scattered light SL is difficult to leak out of the first light-transmitting substrate 10 and the second light-transmitting substrate 20. As a result, in the display state, the display device 1 of the present embodiment allows the background to be more visible from one surface of the display panel toward the other surface thereof. Therefore, the viewer can view the displayed image together with the background.

In the present embodiment, the example has been described in which the multilayered film 7 is located on the first principal surface 20A of the second light-transmitting substrate 20. However, the same operational advantage is achieved when the multilayered film 7 is located on the first principal surface 10A of the first light-transmitting substrate 10 instead of on the first principal surface 20A of the second light-transmitting substrate 20.

First Modification

FIG. 17 is a sectional view illustrating an exemplary section of a display device according to a first modification of the present embodiment. The same components as those described above in the present embodiment are denoted by the same reference numerals, and the description thereof will not be repeated.

As illustrated in FIG. 17, the first principal surface 20A of the second light-transmitting substrate 20 and the multilayered film 7 are covered with a light-transmitting protection layer 98. For example, an organic film containing an acrylic material as a base compound, or an inorganic film, such as a silicon oxide film or a silicon nitride film, is used as the protection layer 79. The protection layer 98 can prevent the multilayered film 7 from being damaged.

Second Modification

FIG. 18 is a sectional view illustrating an exemplary section of a display device according to a second modification of the present embodiment. The same components as those described above in the present embodiment or the modification thereof are denoted by the same reference numerals, and the description thereof will not be repeated.

As illustrated in FIG. 18, the display device 1 according to the second modification of the present embodiment includes the multilayered film 7 on the outer surface of the first light-transmitting substrate 10. As illustrated in FIG. 18, in the multilayered film 7, the reflection layer 71 and the light-absorbing layer 72 are stacked in this order from the first light-transmitting substrate 10 side. The reflection layer 71 is located on the first principal surface 10A of the first light-transmitting substrate 10. The light that has propagated in the first light-transmitting substrate 10 and reached the multilayered film 7 is reflected by the multilayered film 7 back into the first light-transmitting substrate 10, and the external light that has propagated from outside the first light-transmitting substrate 10 and reached the multilayered film 7 is absorbed by the multilayered film 7. In the present embodiment, the multilayered film 7 is disposed at a position overlapping with the scanning lines 12 and the signal lines 13 (refer to FIG. 1) in the plan view. As a result, the multilayered film 7 has a grid shape in the plan view.

FIGS. 19A to 19E are explanatory diagrams for schematically explaining a method of manufacturing the display device according to the second modification of the present embodiment. Also in the method of manufacturing the display device according to the second modification of the present embodiment, the seal bonding process, the multilayered film forming process, the lithography process, the etching process, and the resist removal process described above are sequentially performed to obtain the display device of FIG. 19E.

Protection Layer Film Forming Process

Next to the above-described processes, a film of the protection layer 98 is formed on the first principal surface 20A of the second light-transmitting substrate 20 and the multilayered film 7. If the manufacturing is finished in this state, the display device 1 according to the first modification of the present embodiment described above is produced. In the second modification of the present embodiment, the protection layer 98 serves as a resist. The protection layer 98 prevents the multilayered film 7 from being damaged by the following processes.

Multilayered Film Forming Process

Figure 19A:
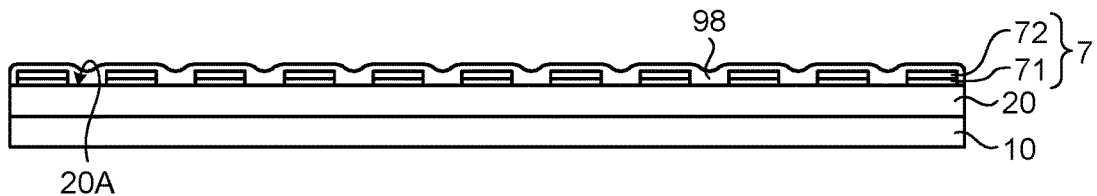
FIG. 19A is an explanatory diagram for schematically explaining a method of manufacturing the display device according to the second modification of the embodiment.
Figure 19B:
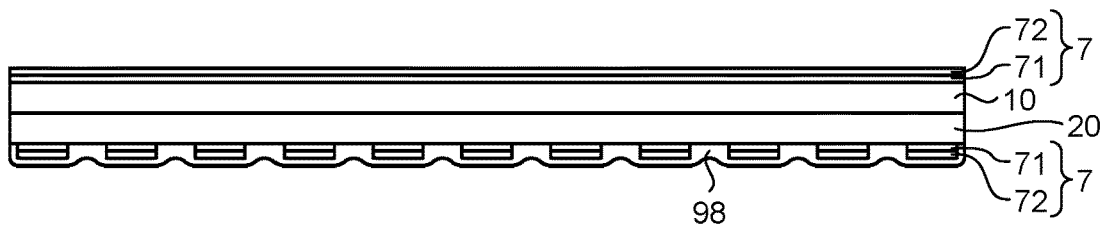
FIG. 19B is another explanatory diagram for schematically explaining the method of manufacturing the display device according to the second modification of the embodiment.

Subsequently, a film of a single layer of chromium is formed by sputtering on the first light-transmitting substrate 10. Subsequently, as illustrated in FIG. 19B, a film of a chromium oxide is formed by the sputtering on the surface of the formed film of the chromium single layer to form the multilayered film 7.

The formed film of the chromium oxide is black, and thus serves as the light-absorbing layer 72 described above. The above-described process allows chromium having metallic luster to remain on the first light-transmitting substrate 10 side. Chromium having metallic luster serves as the reflection layer 71.

Lithography Process

Figure 19C:
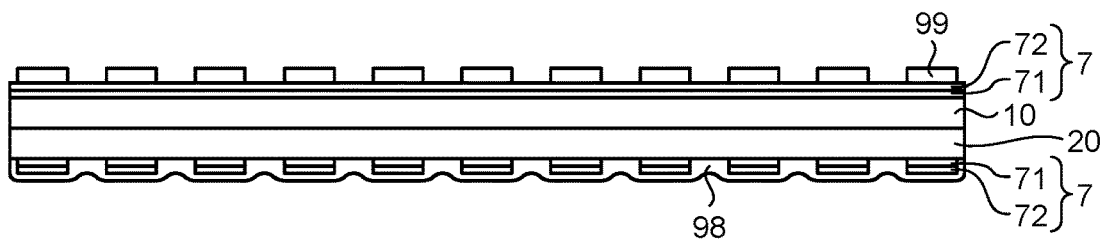
FIG. 19C is still another explanatory diagram for schematically explaining the method of manufacturing the display device according to the second modification of the embodiment.

Subsequently, a resist is applied onto the multilayered film 7, and the patterned exposure is applied to the applied resist. The resist subjected to the patterned exposure is developed, so that the patterned resist layer 99 remains on the multilayered film 7, as illustrated in FIG. 19C.

Etching Process

Figure 19D:
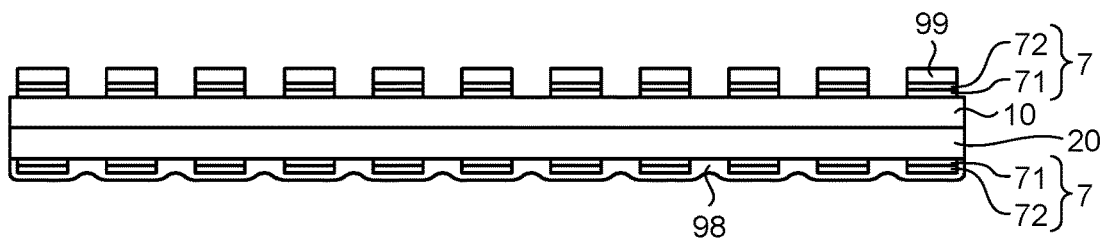
FIG. 19D is still another explanatory diagram for schematically explaining the method of manufacturing the display device according to the second modification of the embodiment.

Subsequently, as illustrated in FIG. 19D, portions of the multilayered film 7 without the resist layer 99 attached thereto are etched.

Resist Removal Process

Figure 19E:
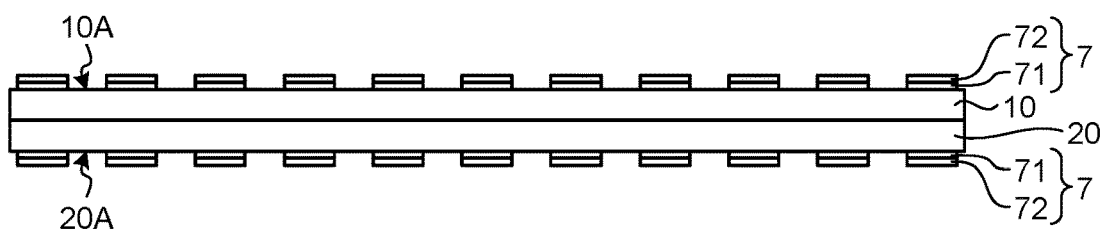
FIG. 19E is still another explanatory diagram for schematically explaining the method of manufacturing the display device according to the second modification of the embodiment.

Subsequently, as illustrated in FIG. 19E, the resist layer 99 after being etched and the protection layer 98 are removed. Subsequently, the dicing process may be performed to cut the substrates into an appropriate size.

As described in the first modification of the present embodiment, the first principal surface 10A of the first light-transmitting substrate 10, the first principal surface 20A of the second light-transmitting substrate 20, and the multilayered film 7 may each be covered with the light-transmitting protection layer.

Third Modification

Figure 20:
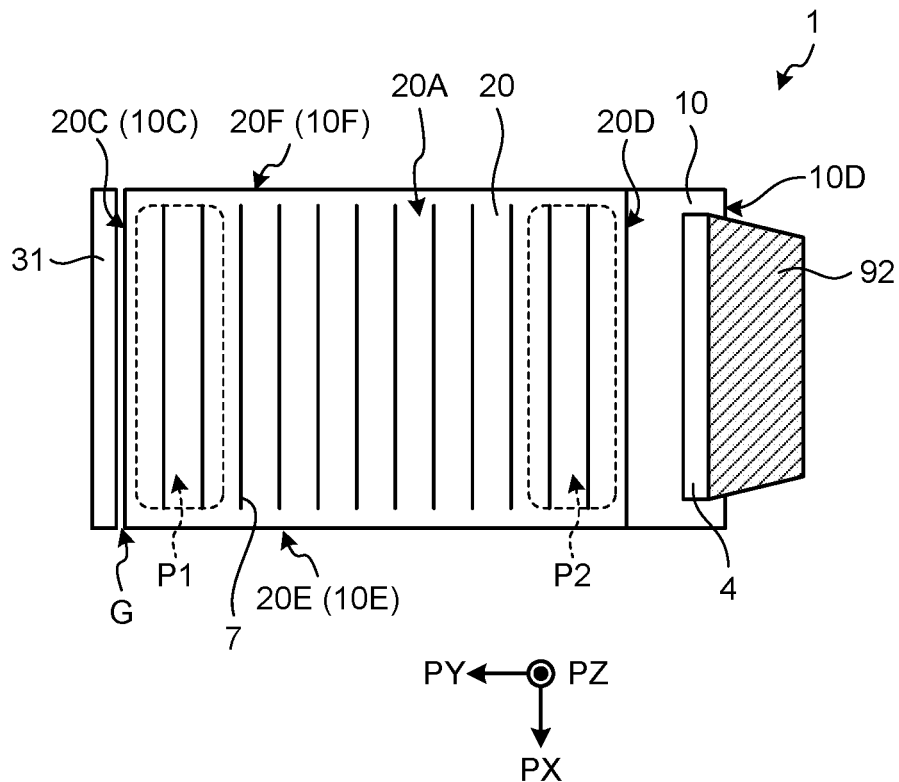
FIG. 20 is a plan view illustrating a planar surface of a display device according to a third modification of the embodiment.

FIG. 20 is a plan view illustrating a planar surface of a display device according to a third modification of the present embodiment. The same components as those described above in the present embodiment or any of the modifications thereof are denoted by the same reference numerals, and the description thereof will not be repeated.

In the third modification of the present embodiment, the multilayered film 7 has a linear shape instead of a grid shape. A region P1 and a region P2 illustrated in FIG. 20 differ in distance from the light emitter 31, and thus differ in in-plane light quantity. The light emitter 31 emits the light in the PY direction. The multilayered film 7 extends in a direction intersecting the PY direction in which the light emitter 31 emits the light. With this configuration, the light-source light propagates while being reflected by the multilayered film 7, the first principal surface 10A of the first light-transmitting substrate 10, and the first principal surface 20A of the second light-transmitting substrate 20. As a result, the difference in in-plane light quantity between the region P1 and the region P2 decreases.

Fourth Modification

Figure 21:
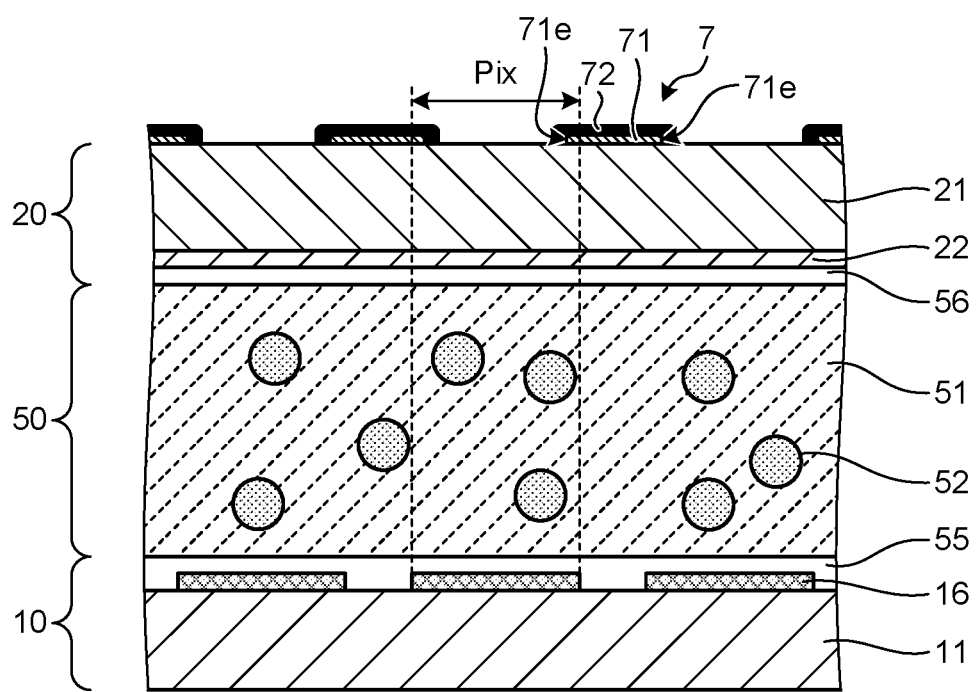
FIG. 21 is a sectional view for explaining a multilayered film according to a fourth modification of the embodiment.

FIG. 21 is a sectional view for explaining a multilayered film according to a fourth modification of the present embodiment. The same components as those described above in the present embodiment or any of the modifications thereof are denoted by the same reference numerals, and the description thereof will not be repeated.

In the fourth modification of the present embodiment, in the multilayered film 7, the reflection layer 71 and the light-absorbing layer 72 are stacked in this order from the second light-transmitting substrate 20 side. Edges 71e of the reflection layer 71 are covered with the light-absorbing layer 72. In the fourth modification of the present embodiment, after the film of the reflection layer 71 is formed, the film of the light-absorbing layer 72 is formed so as to cover the edges 71e of the reflection layer 71 with a different material.

This structure makes the external light difficult to be reflected at the edges 71e of the reflection layer 71. As a result, the viewer is difficult to view the multilayered film 7, and the multilayered film 7 is made invisible.

The reflection layer 71 is made of aluminum or an aluminum alloy having higher light reflectance than that of chromium. The reflection layer 71 may be made of silver or a silver alloy. The light-absorbing layer 72 is made of a resin or a chromium oxide that is more absorbent of light than the reflection layer 71. The light-absorbing layer 72 may be made of a titanium oxide.

Fifth Modification

Figure 22:
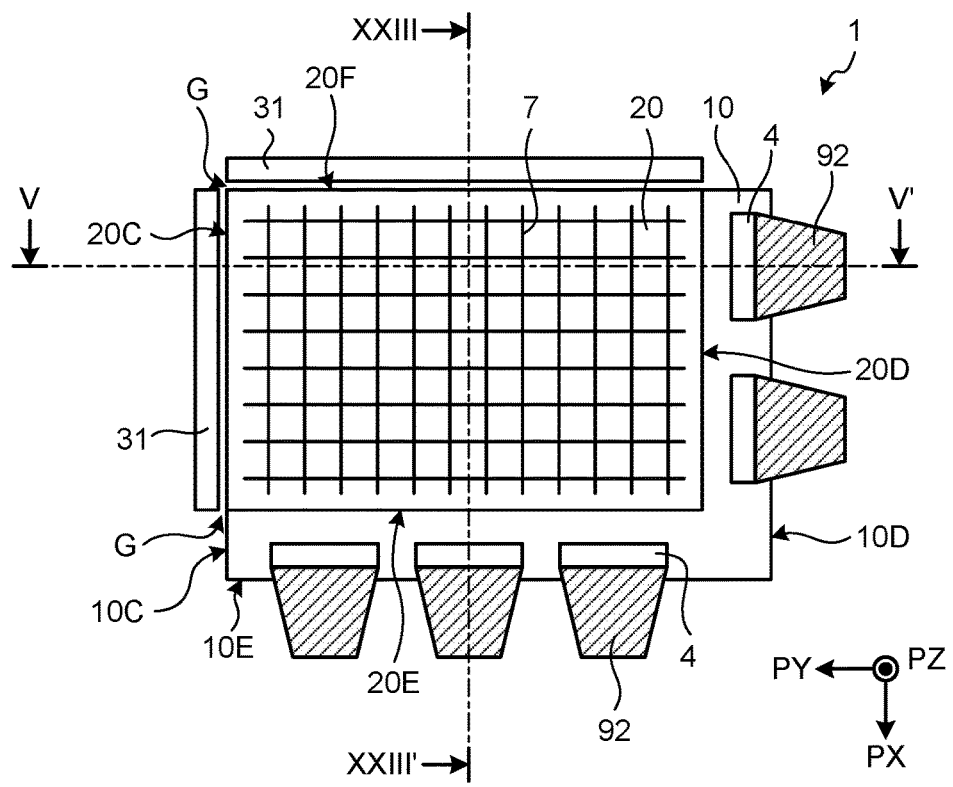
FIG. 22 is a plan view illustrating a planar surface of a display device according to a fifth modification of the embodiment.
Figure 23:
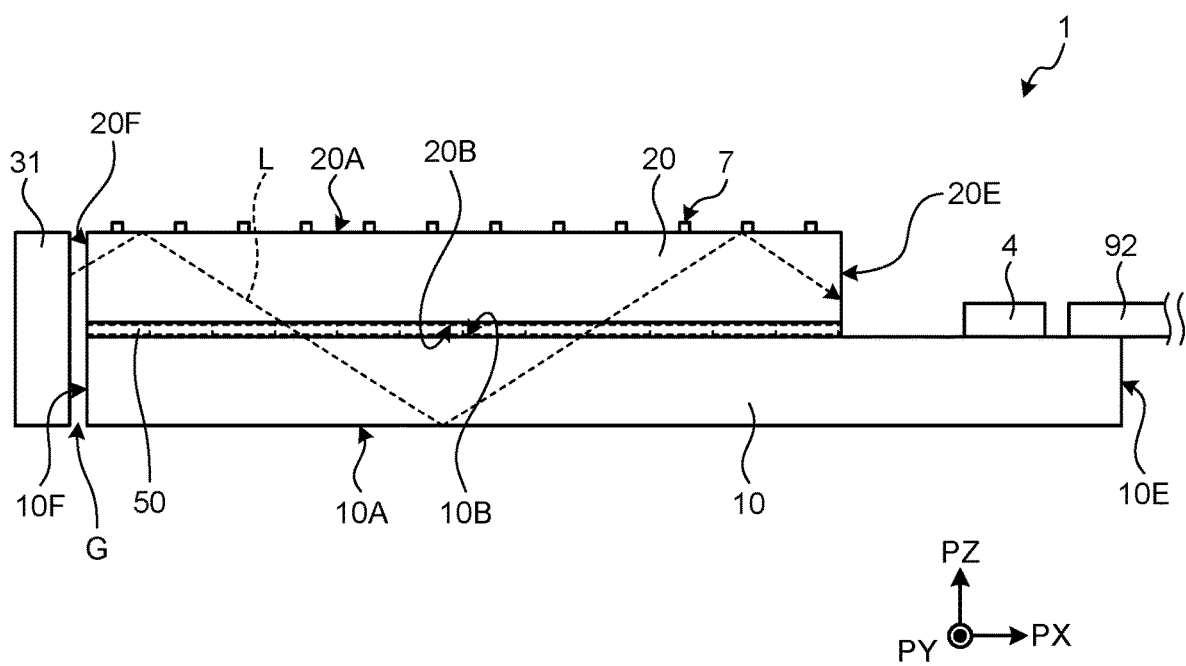
FIG. 23 is a sectional view along XXIII-XXIII' FIG. 22.

FIG. 22 is a plan view illustrating a planar surface of a display device according to a fifth modification of the embodiment. FIG. 23 is a sectional view along XXIII-XXIII' in FIG. 22. The same components as those described above in the present embodiment and the modification thereof are denoted by the same reference numerals, and the description thereof will not be repeated. The section V-V' in FIG. 22 is the same as that of the display device of the present embodiment illustrated in FIG. 5, so that the description thereof will not be repeated.

As illustrated in FIGS. 22 and 23, one of the light emitters 31 is provided so as to face the fourth side surface 20F of the second light-transmitting substrate 20. As illustrated in FIG. 23, the light emitter 31 emits the light-source light L to the fourth side surface 20F of the second light-transmitting substrate 20. The fourth side surface 20F of the second light-transmitting substrate 20 facing the light emitter 31 serves as a plane of light incidence. The gap G is provided between the light emitter 31 and the plane of light incidence. The gap G forms an air layer.

As illustrated in FIG. 23, the light-source light L emitted from the light emitter 31 propagates in a direction away from the fourth side surface 20F while being reflected by the first principal surface 10A of the first light-transmitting substrate 10 and the first principal surface 20A of the second light-transmitting substrate 20.

The display device 1 according to the fifth modification of the present embodiment includes the first light-transmitting substrate 10, the second light-transmitting substrate 20, the liquid crystal layer 50, and the light emitters 31. The two light emitters 31 are disposed so as to face the first side surface 20C and the fourth side surface 20F of the second light-transmitting substrate 20. The light quantity of in-plane light emitted from the two light emitters 31 and propagating in the display panel 2 increases. The in-plane light propagating in the display panel 2 also increases in uniformity. A region P1 and a region P2 illustrated in FIG. 6 differ in distance from the light emitter 31, and thus differ in in-plane light quantity. In contrast, in the display device 1 according to the fifth modification of the present embodiment, the light propagates from two intersecting directions. As a result, the difference in in-plane light quantity decreases.

Sixth Modification

Figure 24:
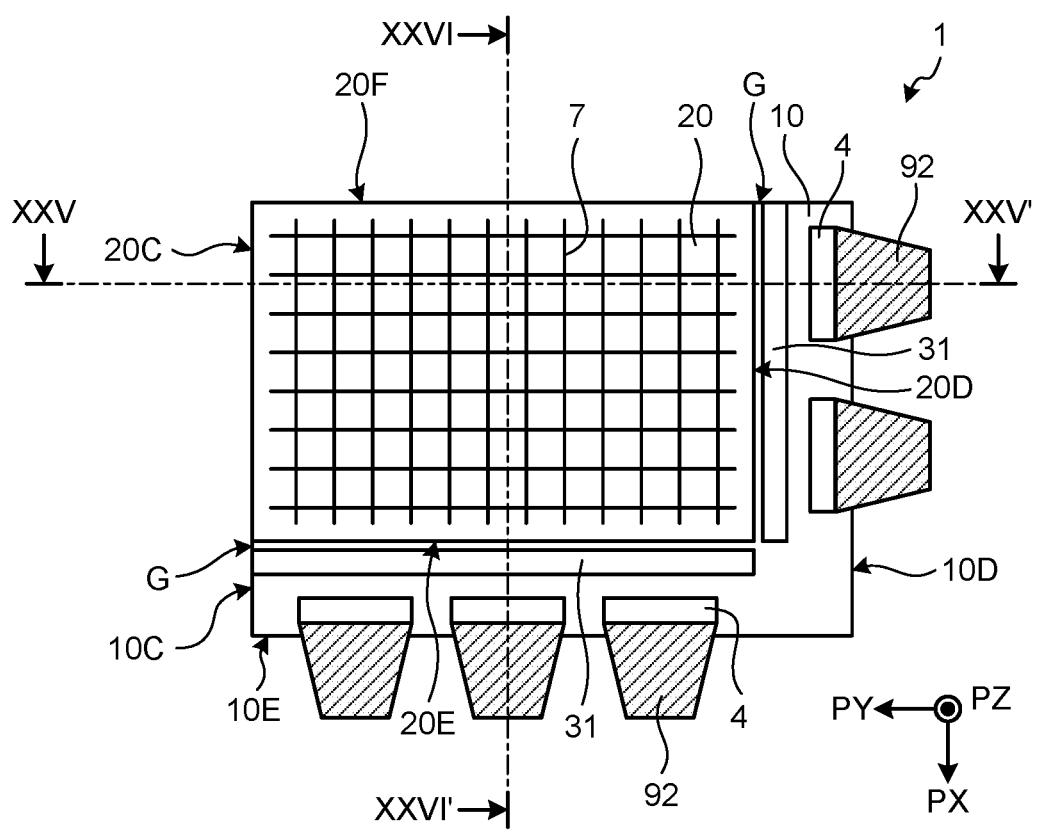
FIG. 24 is a plan view illustrating a planar surface of a display device according to a sixth modification of the embodiment.
Figure 25:
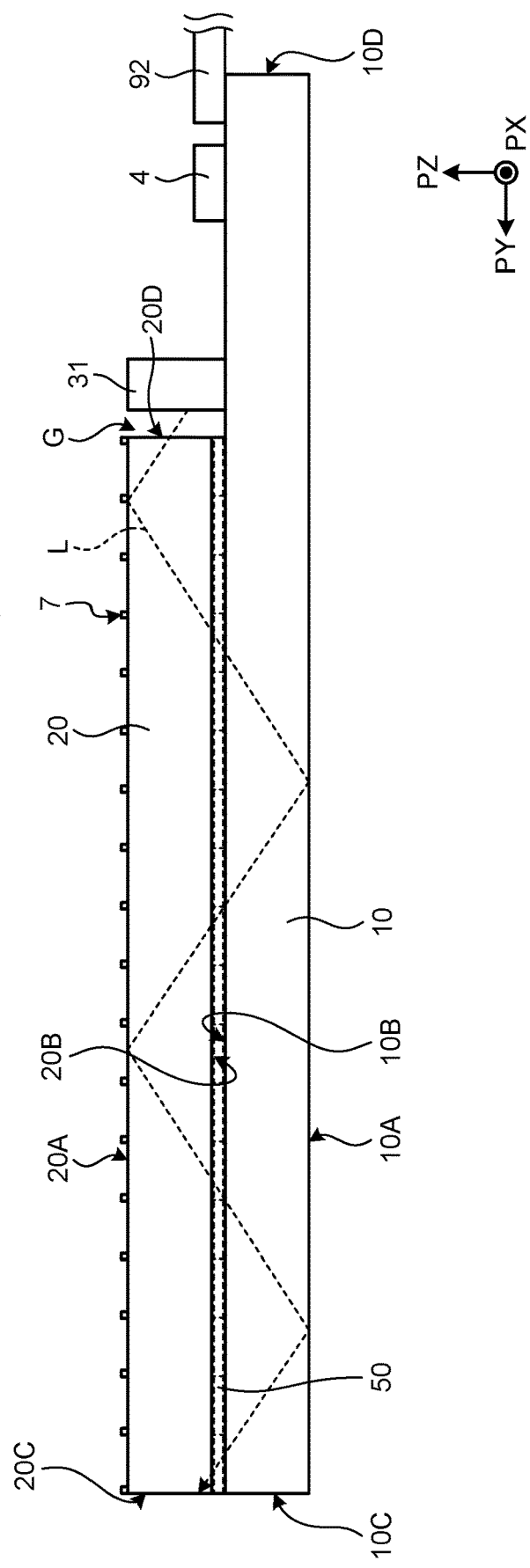
FIG. 25 is a sectional view along XXV-XXV' in FIG. 24.
Figure 26:
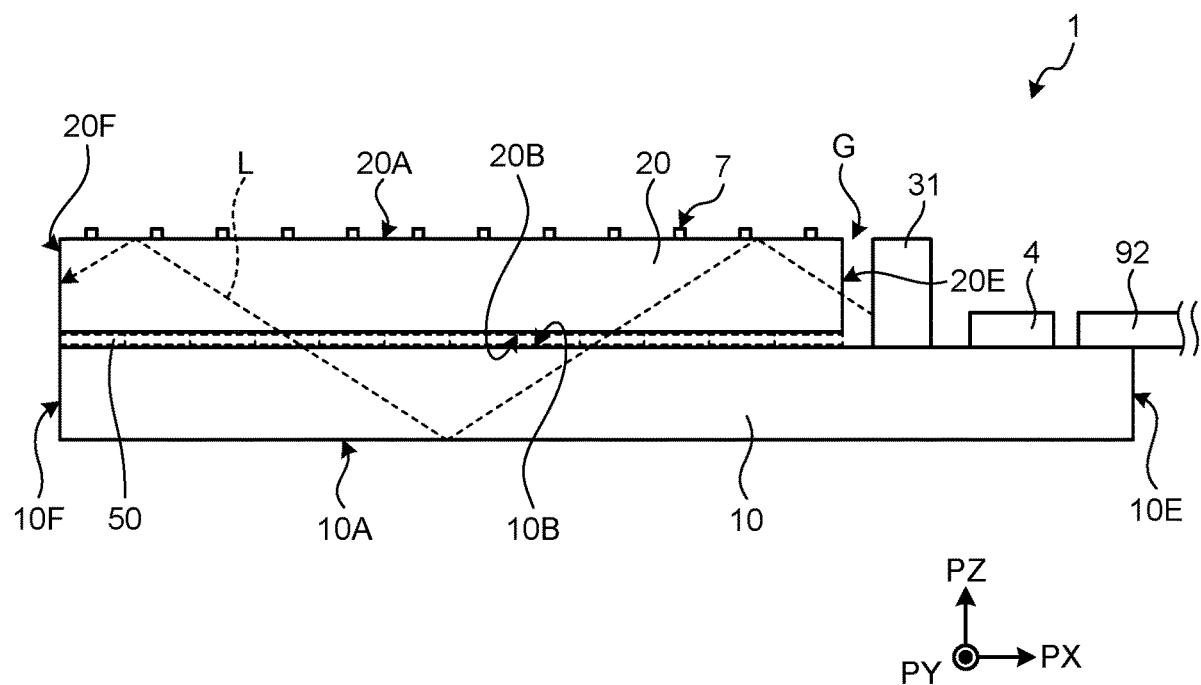
FIG. 26 is a sectional view along XXVI-XXVI' FIG. 24.

FIG. 24 is a plan view illustrating a planar surface of a display device according to a sixth modification of the present embodiment. FIG. 25 is a sectional view along XXV-XXV' in FIG. 24. FIG. 26 is a sectional view along XXVI-XXVI' in FIG. 24. The same components as those described above in the present embodiment or the modification thereof are denoted by the same reference numerals, and the description thereof will not be repeated.

As illustrated in FIGS. 24 and 25, one of the light emitters 31 is provided so as to face the second side surface 20D of the second light-transmitting substrate 20. As illustrated in FIG. 25, the light emitter 31 emits the light-source light L to the second side surface 20D of the second light-transmitting substrate 20. The second side surface 20D of the second light-transmitting substrate 20 facing the light emitter 31 serves as a plane of light incidence. The gap G is provided between the light emitter 31 and the plane of light incidence. The gap G forms an air layer.

As illustrated in FIG. 25, the light-source light L emitted from the light emitter 31 propagates in a direction away from the second side surface 20D while being reflected by the first principal surface 10A of the first light-transmitting substrate 10 and the first principal surface 20A of the second light-transmitting substrate 20.

As illustrated in FIGS. 24 and 26, the other of the light emitters 31 is provided so as to face the third side surface 20E of the second light-transmitting substrate 20. As illustrated in FIG. 26, the light emitter 31 emits the light-source light L to the third side surface 20E of the second light-transmitting substrate 20. The third side surface 20E of the second light-transmitting substrate 20 facing the light emitter 31 serves as a plane of light incidence. The gap G is provided between the light emitter 31 and the plane of light incidence. The gap G forms an air layer.

As illustrated in FIG. 26, the light-source light L emitted from the light emitter 31 propagates in a direction away from the third side surface 20E while being reflected by the first principal surface 10A of the first light-transmitting substrate 10 and the first principal surface 20A of the second light-transmitting substrate 20.

The display device 1 according to the sixth modification of the present embodiment includes the first light-transmitting substrate 10, the second light-transmitting substrate 20, the liquid crystal layer 50, and the light emitters 31. The two light emitters 31 are disposed so as to face the second side surface 20D and the third side surface 20E of the second light-transmitting substrate 20. The light quantity of the in-plane light emitted from the two light emitters 31 and propagating in the display panel 2 increases. The in-plane light propagating in the display panel 2 also increases in uniformity. The region P1 and the region P2 illustrated in FIG. 6 differ in distance from the light emitter 31, and thus differ in in-plane light quantity. In contrast, in the display device 1 according to the sixth modification of the present embodiment, the light propagates from two intersecting directions. As a result, the difference in in-plane light quantity decreases.

In the same manner as the present embodiment, the display device 1 according to the sixth modification of the present embodiment does not include a backlight device or a reflecting plate on the first principal surface 10A side of the first light-transmitting substrate 10 or on the first principal surface 20A side of the second light-transmitting substrate 20. As a result, the background on the first principal surface 20A side of the second light-transmitting substrate 20 is visible from the first principal surface 10A of the first light-transmitting substrate 10, and the background on the first principal surface 10A side of the first light-transmitting substrate 10 is visible from the first principal surface 20A of the second light-transmitting substrate 20.

While the embodiment has been described above, the present disclosure is not limited to the embodiment described above. The content disclosed in the embodiment is merely an example, and can be various modified within the scope not departing from the gist of the present disclosure. Any modifications appropriately made within the scope not departing from the gist of the present disclosure also naturally belong to the technical scope of the present disclosure. All inventions that can be carried out by those skilled in the art through appropriate design modifications based on the invention described above also belong to the technical scope of the present disclosure as long as including the gist of the present disclosure.

The display panel 2 may be, for example, a passive-matrix panel including no switching element. The passive-matrix panel includes first electrodes extending in the PX direction, second electrodes extending in the PY direction, in the plan view, and wiring electrically coupled to the first electrodes or the second electrodes. The first and second electrodes and the wiring are made of, for example, ITO. For example, the first light-transmitting substrate 10 including the first electrodes and the second light-transmitting substrate 20 including the second electrodes are disposed so as to face each other across the liquid crystal layer 50.

Although the example has been described in which the first and the second orientation films 55 and 56 are vertical orientation films, the first and the second orientation films 55 and 56 may be both horizontal orientation films. The first and the second orientation films 55 and 56 only need to have a function to orient a monomer in a predetermined direction when polymerizing the monomer. As a result, the monomer is polymerized into a polymer in the state oriented in the predetermined direction. When the first and the second orientation films 55 and 56 are the horizontal orientation films, the direction of the optical axis Ax1 of the bulk 51 is equal to the direction of the optical axis Ax2 of the fine particles 52 and is orthogonal to the PZ direction when no voltage is applied between the pixel electrode 16 and the common electrode 22. The direction orthogonal to the PZ direction corresponds to the PX direction or the PY direction along a side of the first light-transmitting substrate 10 in the plan view.

What is claimed is:
1. A display device comprising:
a first light-transmitting substrate having a first principal surface, a second principal surface as a surface parallel to the first principal surface, and side surfaces including a first side surface;
a second light-transmitting substrate having a first principal surface, a second principal surface as a surface parallel to the first principal surface, and side surfaces including a first side surface, and disposed so that the second principal surface of the first light-transmitting substrate and the second principal surface of the second light-transmitting substrate face each other;

a liquid crystal layer comprising polymer dispersed liquid crystals between the second principal surface of the first light-transmitting substrate and the second principal surface of the second light-transmitting substrate;

a light emitter disposed so as to face at least one of the first side surface of the first light-transmitting substrate and the first side surface of the second light-transmitting substrate; and a multilayered film that is disposed on the first principal surface of the second light-transmitting substrate, the first principal surface being an upper outer surface side of the display device, and the multilayered film having openings corresponding to a plurality of pixels, wherein light from the light emitter propagates in a direction away from the first side surface facing the light emitter while being reflected by the first principal surface of the first light-transmitting substrate and the first principal surface of the second light-transmitting substrate, and the multilayered film is configured to reflect light from the first principal surface of the first light-transmitting substrate, and absorb external light from outside the second light-transmitting substrate.

2. The display device according to claim 1, wherein when the polymer dispersed liquid crystals are in a non-scattering state, a background on the first principal surface side of the second light-transmitting substrate is visible from the first principal surface of the first light-transmitting substrate, or a background on the first principal surface side of the first light-transmitting substrate is visible from the first principal surface of the second light-transmitting substrate.

3. The display device according to claim 1, wherein the multilayered film comprises a reflection layer and a light-absorbing layer.

4. The display device according to claim 2, wherein the multilayered film comprises a reflection layer and a light-absorbing layer.

5. The display device according to claim 4, wherein the reflection layer is disposed between the light-absorbing layer and the second light-transmitting substrate and in direct contact with the first principal surface of the second light-transmitting substrate, the first principal surface being the upper outer surface side of the display device.

6. The display device according to claim 3, wherein the reflection layer contains chromium, and the light-absorbing layer is made of a chromium oxide.

7. The display device according to claim 3, wherein the reflection layer contains aluminum, and the light-absorbing layer is made of a resin or a chromium oxide.

8. The display device according to claim 3, wherein
the reflection layer is disposed between the light-absorbing layer and the second light-transmitting substrate and in direct contact with the first principal surface of the second light-transmitting substrate, the first principal surface being the upper outer surface side of the display device,
the reflection layer has a side edge and an outer surface, and
the light-absorbing layer covers the side edge and the outer surface of the reflection layer that is in direct contact with the first principal surface of the second light-transmitting substrate.

9. The display device according to claim 1, wherein
the first light-transmitting substrate comprises a plurality of signal lines, a plurality of scanning lines three-dimensionally intersecting the signal lines in a plan view, and switching elements at three dimensionally intersecting portions where the signal lines three-dimensionally intersect the scanning lines, and
the multilayered film overlaps with the signal lines, the scanning lines, or the switching elements in the plan view.

10. The display device according to claim 1, wherein
the first light-transmitting substrate comprises a plurality of signal lines and a plurality of scanning lines three-dimensionally intersecting the signal lines in a plan view, and
the multilayered film overlaps with the signal lines and the scanning lines in the plan view, and has a grid shape.

* * * * *